United States Patent
Ishikawa et al.

(10) Patent No.: US 6,880,293 B2
(45) Date of Patent: Apr. 19, 2005

(54) AUTOMOTIVE WINDOWPANE SUPPORT STRUCTURE

(75) Inventors: Takeshi Ishikawa, Wako (JP); Shun Kadota, Wako (JP); Kazunori Watanabe, Wako (JP); Hidetoshi Ijuin, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/813,988

(22) Filed: Mar. 31, 2004

(65) Prior Publication Data

US 2004/0194390 A1 Oct. 7, 2004

(30) Foreign Application Priority Data

Apr. 2, 2003 (JP) ........................................ 2003-099651
May 6, 2003 (JP) ........................................ 2003-128390

(51) Int. Cl.[7] ............................................. E05D 15/16
(52) U.S. Cl. ........................................... 49/414; 49/428
(58) Field of Search ........................... 49/352, 349, 348, 49/374

(56) References Cited

U.S. PATENT DOCUMENTS

| 4,240,227 | A | * | 12/1980 | Hasler et al. ................. | 49/348 |
| 4,457,109 | A | * | 7/1984 | Royse .......................... | 49/374 |
| 4,483,100 | A | * | 11/1984 | Blankenburg et al. ........ | 49/352 |
| 4,503,639 | A | | 3/1985 | Rossie et al. | |
| 4,571,886 | A | * | 2/1986 | Shiraishi ....................... | 49/374 |
| 4,621,453 | A | * | 11/1986 | Watanabe et al. ............. | 49/374 |
| 4,628,637 | A | * | 12/1986 | Okada et al. .................. | 49/374 |
| 4,631,865 | A | * | 12/1986 | Motonami et al. ............ | 49/374 |
| 4,689,916 | A | * | 9/1987 | Shimizu ....................... | 49/374 |
| 4,823,511 | A | * | 4/1989 | Herliczek et al. ............. | 49/404 |
| 4,875,307 | A | * | 10/1989 | Barbero ....................... | 49/374 |
| 4,969,295 | A | * | 11/1990 | Nishikawa et al. ........... | 49/502 |
| 4,970,828 | A | * | 11/1990 | Mesnel et al. ................ | 493/74 |
| 5,054,242 | A | * | 10/1991 | Keys et al. ................. | 49/490.1 |
| 5,469,668 | A | * | 11/1995 | Heim et al. ................... | 49/502 |
| 5,613,325 | A | * | 3/1997 | Mariel ......................... | 49/404 |
| 6,141,910 | A | * | 11/2000 | Kobrehel et al. ............. | 49/378 |

FOREIGN PATENT DOCUMENTS

JP 3-5476 1/1991

* cited by examiner

Primary Examiner—Gregory J. Strimbu
(74) Attorney, Agent, or Firm—Rankin, Hill, Porter & Clark LLP

(57) ABSTRACT

An automotive windowpane support structure includes a slider bonded to an inner surface of a windowpane with an adhesive. The slider is vertically movable along a rail member. The rail member is divided into and comprised of two parts, an inner guide and an outer guide. The inner guide is provided at a sash portion of a door. The outer guide is provided at a garnish provided opposite to the sash portion and supports a side portion of the slider protruded from an edge of the windowpane. The garnish is provided such that its outer surface is flush with an outer surface of the windowpane.

6 Claims, 21 Drawing Sheets

AUTOMOTIVE WINDOWPANE SUPPORT STRUCTURE

FIELD OF THE INVENTION

The present invention relates to an automotive windowpane support structure and, more particularly, to an automotive windowpane support structure configured to permit a windowpane to vertically move along a guide member.

BACKGROUND OF THE INVENTION

A structure for supporting an automotive windowpane such as a windowpane in a front side door in a vertically movable manner is presented, for example, in Japanese Patent Laid-Open Publication No. HEI-3-5476. This windowpane support structure will be described with reference to FIG. 17 hereof.

Referring to FIG. 17, an automotive windowpane support structure 300 includes a slider 307 fixed to a windowpane 301 and a rail 306 slidably supporting the slider 307. The slider 307 is provided on an inside surface 302 of the windowpane 301 at the passenger compartment side, and is fixed to the windowpane 301 with a bolt 305 inserted through a mounting hole 304 from an outside surface 303 of the windowpane 301 at the outside of the automobile.

The windowpane 301 is moved up and down by a lifting means not shown. The slider 307 moves in a vertical direction along the rail 306, thereby moving the windowpane 301 up and down.

In the above windowpane support structure 300, however, to fix the slider 307 to the inside surface 302 of the windowpane 301, the bolt 305 is inserted from the outside surface 303 of the windowpane 301 into the mounting hole 304 to fix the slider 307 with the inserted bolt 305, so that a head 308 of the bolt 305 is protruded to the outer surface 303 of the windowpane 301. When the automobile is running, air flowing along the automobile body passes over the head 308 of the bolt 305 as shown by arrows, becoming turbulent, and causing hissing sounds.

In addition, the protrusion of the head 308 of the bolt 305 outside the windowpane 301 causes the head 308 of the bolt 305 to be seen from outside the passenger compartment, leaving room for improvement in aesthetic terms.

Moreover, for an improvement in automobile design and a reduction in air resistance, there is a demand for a flatter body surface, that is, a flusher body surface.

In the automotive windowpane support structure 300, the rail 306 has an opening 309 with a width S made smaller than that of the slider 303 so as to prevent the slider 307 from sliding out of the opening 309.

When fitting the slider 307 into the rail 306, the slider 307 is thus forcedly pressed into the opening 309 of the narrow width S. The operation of fitting the slider 307 into the rail 306 is difficult.

As a fastening member for mounting the rail 306 of the automotive windowpane support structure 300 to a window sash, a clip (not shown) is generally known.

To mount the rail 306 to the sash with the clip, it is necessary to provide clip mounting portions to the sash and the rail 306, respectively.

Specifically, a mounting portion (not shown) is projected from the side of the rail 306 and the sash is partially projected opposite to the mounting portion. To the projected sash portion, the mounting portion of the rail 306 is mounted with the clip to mount the rail 306 to the window sash.

This mounting method, however, requires that the mounting portion be projected from the side of the rail 306 and the sash be partially projected opposite to the mounting portion. The mounting portion of the rail 306 and the projected portion of the sash cover the edge of the windowpane 301 to a relatively large extent.

It is thus required to increase the width of a concealing portion provided at the edge of the windowpane 301 for concealing the mounting portion of the rail 306 and the projected portion of the sash.

SUMMARY OF THE INVENTION

It is therefore an object of the present invention to provide an automotive windowpane support structure which allows for prevention of hissing or air cutting sounds when the automobile is running, an improvement in aesthetic terms, a flusher body surface, a facilitated assembly operation, and a reduction in width of a concealing portion at an edge of a windowpane.

According to an aspect of the present invention, there is provided an automotive windowpane support structure, which comprises: a windowpane mounted vertically movably along at least one of front and rear sash portions of an automotive door; a body exterior part mounted to the sash portion in such a manner as to be opposite to an outer surface of the sash portion and to be flush with the windowpane; an inner guide mounted to the sash portion in such a manner as to be opposite to the body exterior part; an outer guide mounted to an inside surface of the body exterior part in such a manner as to be opposite to the inner guide; a rail member comprising the inner guide and the outer guide; and a slider movable along the rail member, the slider being bonded to an inner edge surface of the windowpane with an adhesive in such a manner that a side portion thereof is protruded from the windowpane; wherein, the outer guide supports the protruded side portion of the slider, and the inner guide supports other portions than the side portion of the slider, whereby the slider is restricted in movement in automobile longitudinal and transverse directions.

In the windowpane support structure, the slider is attached to the inner surface of the windowpane with the adhesive, so that there is no need to mount the slider with a bolt. This eliminates the need for exposing a bolt head at the outer surface of the windowpane, preventing the generation of hissing sounds due to a bolt head, and improving the appearance of the automobile. In addition, the outer surface of the body exterior part is flush with the outer surface of the windowpane, so that the appearance (design) can be further improved.

The fact that there is no need to expose a bolt head at the outer surface of the windowpane and the outer surface of the body exterior part is flush with the outer surface of the windowpane leads to a reduced air resistance of the automobile and the flatness of the body surface, that is, a flush surface.

Further, since the rail member is comprised of the inner guide and the outer guide, the inner guide being provided at the sash portion and the outer guide being provided at the body exterior part, the slider can be supported by the inner guide and the outer guide.

The division of the rail member into two parts, the inner guide and the outer guide, allows the slider to be easily fitted in the rail member with little effort.

The outer guide is provided at the body exterior part, and a portion of the slider protruded from the edge of the windowpane, that is, the side portion of the slider is supported on the outer guide. As a result, the side portion of the slider protruded from the edge of the windowpane can be concealed by the body exterior part from view from outside.

Here, the body exterior part corresponds to a decorative garnish, a rear flat portion of an outer sash portion constituting a part of the sash portion, or a door mirror part.

Preferably, the slider takes the form of a bar member extending vertically along the inner edge surface of the windowpane. Thus forming the slider as a bar member which is supported by the rail member makes it possible to provide the slider only at one of front and rear inner edge surfaces of the windowpane to vertically move the windowpane in a stabilized state.

It is preferred that the inner guide preferably has a guide bottom superimposed on the sash portion, and a superimposed portion is fixed thereto. The fixing of the guide bottom of the inner guide to the sash portion eliminates the need for projecting a mounting portion from the side of the inner guide and projecting the sash portion opposite to the mounting portion as in a conventional art. This makes it possible to reduce the width of a concealing portion: to be provided at an inner edge surface of the windowpane.

Desirably, the slider has an extending portion extending along an inner surface of the windowpane, the extending portion being bonded to the inner edge surface of the windowpane. As a result, the extending portion can be provided with a large dimension. The extending portion of a large width is bonded to the inner edge surface of the windowpane to ensure a large area bonded to the windowpane, thereby to be able to be firmly attached to the inner edge surface of the windowpane.

In a preferred form, the inner guide has a seal, the seal being put against the extending portion.

In order to maintain the sealing of a passenger compartment, a seal is generally provided at the inner guide and is put against the inner surface of the windowpane. To put the seal against the inner surface of the windowpane, it is necessary to locate it toward the center of the windowpane, avoiding the extending portion. To conceal the seal and the like, a concealing portion provided at the edge of the windowpane is increased in width. To avoid this, the seal is put against the extending portion on the windowpane so as to maintain the sealing of the passenger compartment. As a result, the seal can be located closer to the periphery of the windowpane, leading to a reduction in width of the concealing portion provided at the edge of the windowpane for concealing the seal and the like.

The seal may be formed integrally with the inner guide. The integral formation of the seal with the inner guide allows the seal to be mounted to the sash portion with the inner guide. Thus, the seal can be easily mounted to the sash portion with little effort.

BRIEF DESCRIPTION OF THE DRAWINGS

Certain preferred embodiments of the present invention will be described in detail below, by way of example only, with reference to the accompanying drawings, in which:

FIGS. 7A to 7F are diagrams illustrating the steps of assembling the windowpane support structure according to the first embodiment, wherein FIG. 7A illustrates a step of bonding a guide bottom; FIG. 7B illustrates steps of projecting a threaded portion of a stud bolt into a first space between an outer sash portion and an inner sash portion, and inserting a nut through a first insertion hole of an inner sash portion; FIG. 7C illustrates a step of screwing a nut onto a threaded portion of a stud bolt to fix a rear inner guide to an outer front flat portion of an outer sash portion; FIG. 7D illustrates steps of moving a rear outer guide toward an outer surface of a rear slider, and moving a boss of a rear garnish toward a through hole of an outer sash portion; FIG. 7E illustrates steps of aligning a threaded hole of a boss with a through hole of an outer middle flat portion, and inserting a bolt through a second insertion hole of an inner sash portion into a second space within a rear sash portion; FIG. 7F illustrates steps of mounting a rear garnish to an outer sash portion and slidably sandwiching a slider between a rear inner guide and a rear outer guide;

FIG. 15A illustrates steps of putting a guide bottom of a base on an outer front flat portion of an outer sash portion, and inserting a rivet through a through hole of an outer front flat portion and a through hole of a guide bottom; FIG. 15B illustrates steps of fitting an inner restriction rubber to a base, and fitting a fitting portion formed at a proximal portion of a seal to a fitting depression of a projecting portion; FIG. 15C illustrates steps of bonding a rear extending portion to a rear inner edge surface of a windowpane; FIG. 15D illustrates steps of putting an inside portion of a rear slider against a part of a depressed inner periphery and a lip, while putting a distal edge portion of a lip of a seal against a rear extending portion located inside a windowpane; FIG. 15E illustrates steps of aligning a threaded hole of a boss with a through hole of an outer middle flat portion, and inserting a bolt through a second insertion hole of an inner sash portion into a second space within a rear sash portion; FIG. 15F illustrates steps of mounting a rear garnish to an outer sash portion, and slidably sandwiching a rear slider between a rear inner guide and a rear outer guide;

DETAILED DESCRIPTION OF THE PREFERRED EMBODIMENTS

Figure 1:
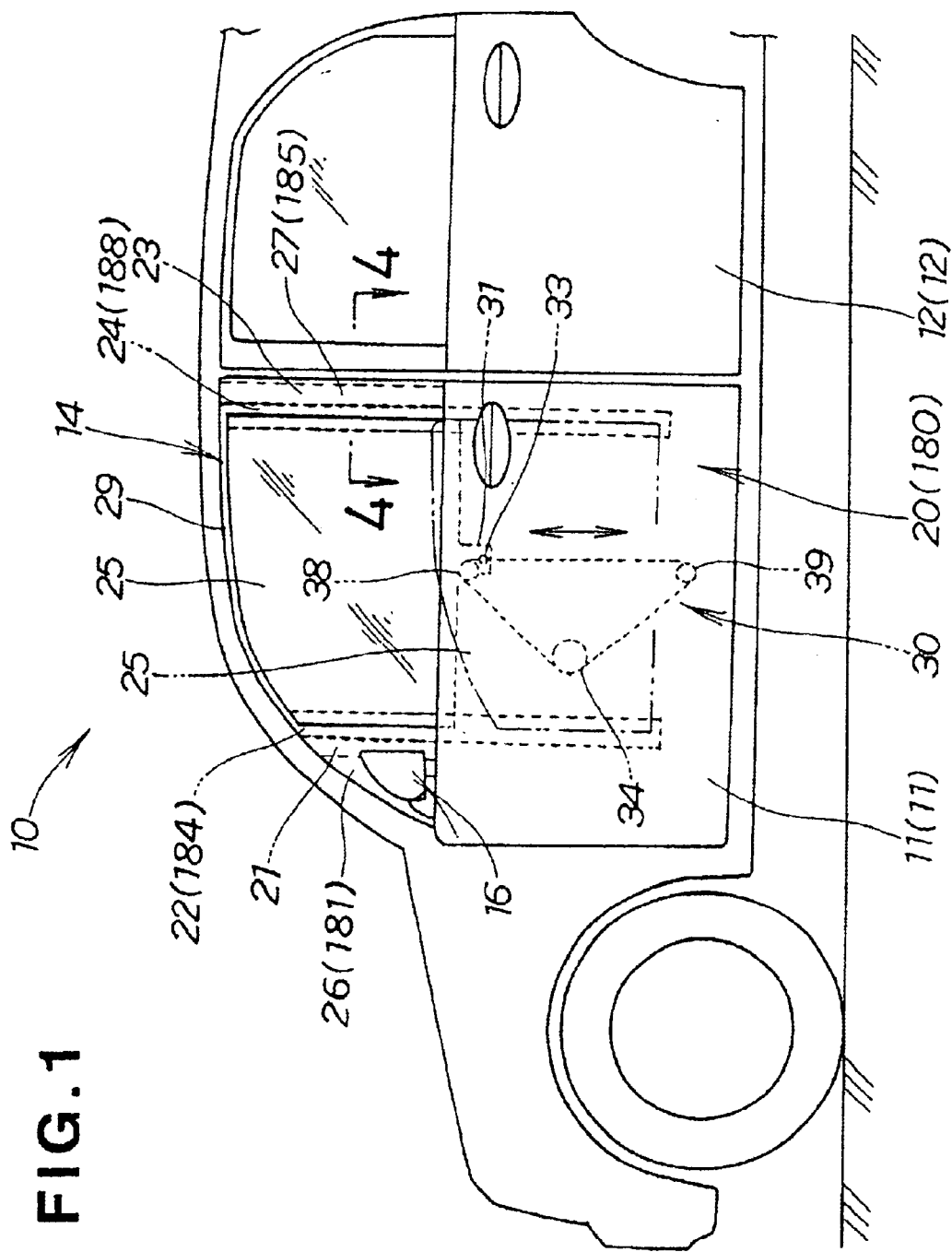
FIG. 1 is a side view of an automobile provided with an automotive windowpane support structure according to a first embodiment of the present invention.

Initial reference is made to FIG. 1 illustrating in side elevation an automobile provided with an automotive windowpane support structure first embodiment) according to the present invention. In the Figure, parenthetically indicated reference numerals (180), (181), (184), (185) and (188) designate parts of a third embodiment.

An automobile 10 has left and right front side doors 11, 11 (only left one shown) as automotive doors and automotive windowpane support structures 20, 20 provided at the doors 11, 11, respectively (only the automotive windowpane support structure 20 at the left front side door 11 shown), and has left and right rear side doors 12, 12 (only left one shown) and automotive windowpane support structures (not shown) provided at the doors 12, 12, respectively.

Each automotive windowpane support structure 20 has a front rail member (rail member) 22 provided along a front sash portion (sash portion) 21 in the automotive door 11, and has a rear rail member (rail member) 24 provided along a rear sash portion (sash portion) 23 in the automotive door 11. A windowpane 25 is mounted along the front and rear rail members 22, 24 in a vertically movable manner. A front decorative garnish (a door mirror part as a body exterior part) 26 is provided opposite to the outer surface of the front sash portion 21. A rear decorative garnish (a decorative garnish as a body exterior part) 27 is provided opposite to the outer surface of the rear sash portion 23. The front and rear garnishes 26, 27 are mounted flush with the windowpane 25.

A holder 31 is attached to the middle of the lower edge of the windowpane 25. A carrier 33 of a regulator 30 is attached to the holder 31. The carrier 33 is moved up and down by the rotation of a drum 34, and the windowpane 25 moves up and down with the carrier 33.

The upper ends of the front and rear sash portions 21, 23 are interconnected by an upper sash portion 29, constituting a window sash 14 of the automotive door 11. The front garnish 26 is provided with a door mirror 16.

Figure 2:
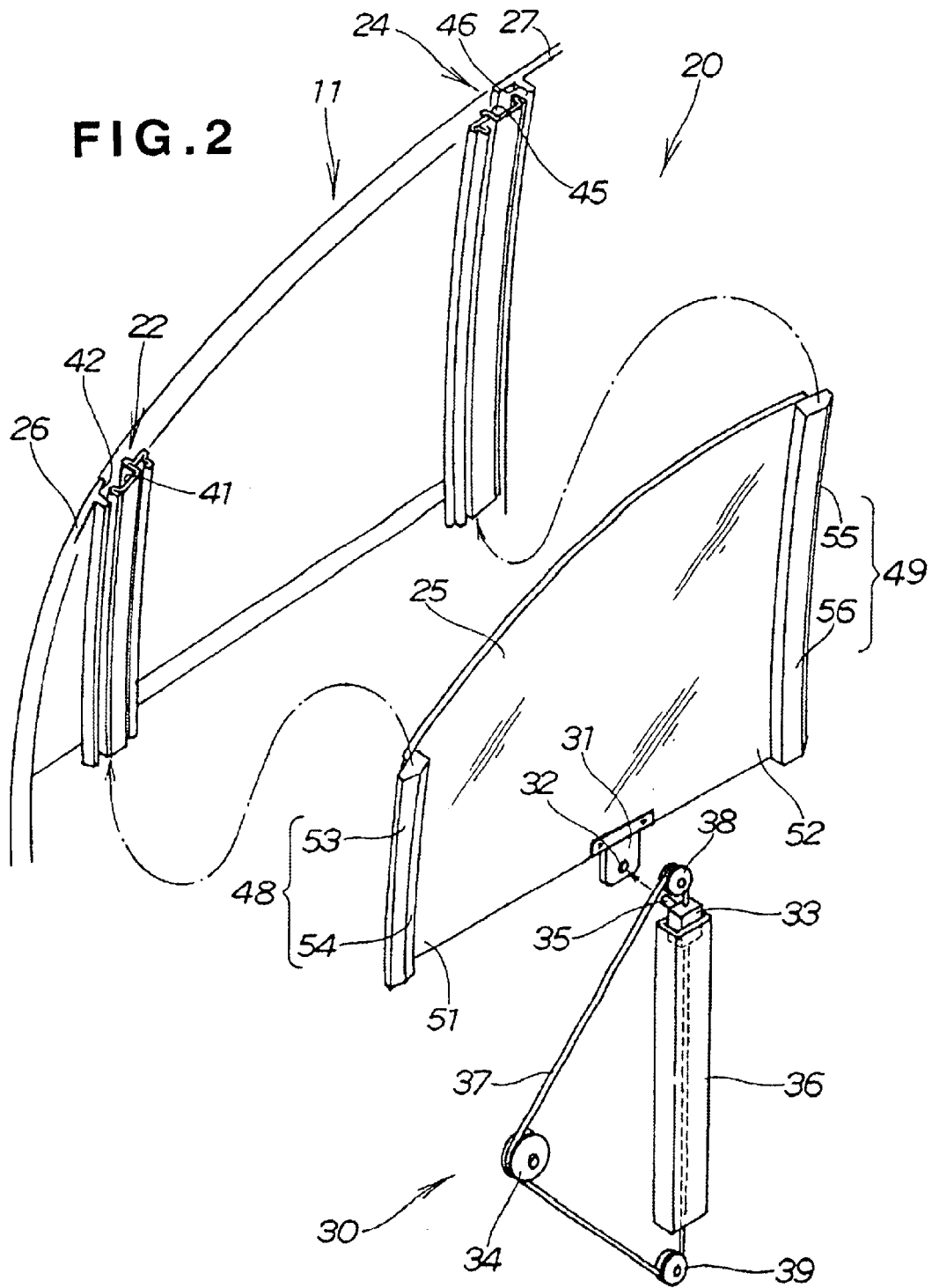
FIG. 2 is an exploded perspective view of a door and a windowpane shown in FIG. 1.

FIG. 2 illustrates the automotive windowpane support structure 20 according to the first embodiment of the present invention. The left and right automotive doors 11 are provided with the automotive windowpane support structures 20 of the same configuration.

With reference to FIG. 2, the automotive windowpane support structure 20 provided at the right automotive door 11 will be exemplarily described to facilitate the understanding of the automotive windowpane support structure 20.

The automotive windowpane support structure 20 has a front inner guide (inner guide) 41 provided at the side of the front sash portion 21 (see FIG. 1) opposite to the front garnish 26, and a front outer guide (outer guide) 42 provided at the side of the front garnish 26 opposite to the front inner guide 41, the front outer guide 42 and the front inner guide 41 thus forming the front rail member 22, and also has a rear inner guide (inner guide) 45 provided at the side of the rear sash portion (see FIG. 1) opposite to the rear garnish 27 and a rear outer guide (outer guide) 46 provided at the side of the rear garnish 27 opposite to the rear inner guide 45, the rear outer guide 46 and the rear inner guide 45 thus forming the rear rail member 24.

The automotive windowpane support structure 20 also has front and rear sliders (sliders) 48, 49 movable along the front and rear rail members 22, 24, provided on front and rear inner edge surfaces (inner edge surfaces) 51, 52 of the windowpane 25. Side portions (slider side portions) 53, 55 of the front and rear sliders 48, 49 are protruded from the windowpane 25, respectively. The protruded side portions 53, 55 of the front and rear sliders 48, 49 are supported on the front and rear outer guides 42, 46. The other front and rear portions (hereinafter referred to as "front and rear bonded portions") 54, 56 are supported 26 on the front and rear inner guides 41, 45. Thus, the front and rear sliders 48, 49 are restricted in movement in automobile longitudinal and transversal directions.

The front slider 48 is a bar member extending vertically along the front inner edge surface (inner edge surface) 51 of the windowpane 25.

The rear slider 49 is a bar member extending vertically along the rear inner edge surface (inner edge surface) 52 of the windowpane 25.

The front and rear sliders 48, 49 are formed as bar members so that the bar members, or the sliders 48, 49, are supported by the front and rear rail members 22, 24, respectively.

The formation of the front and rear sliders 48, 49 as bar members makes it possible to provide only one of the sliders 48, 49 to the front or rear inner edge surface 51, 52 of the windowpane 25 to move the windowpane 25 up and down in a stabilized state.

Thus, for example, only supporting the rear slider 49 by the rear rail member 24 allows the windowpane 25 to be moved up and down in a stabilized state. It is therefore possible to eliminate the front slider 48 and the front rail member 22.

As a result, the number of components of the automotive windowpane support structure 20 can be reduced to further facilitate the assembly operation.

The regulator 30 has the holder 31 attached to the middle of the lower edge of the windowpane 25, the carrier 33 having a connecting pin 35 fitted into a fitting hole 32 of the holder 31, a guide rail 36 in which the carrier 33 is movably disposed, a wire 37 to which the carrier 33 is connected, and upper and lower guide rollers 38, 39 between which the wire 37 runs via the drum 34.

In the regulator 30, the drum 34 is rotated by a drive motor (not shown) to pull the wire 37, moving the carrier 33 up or down along the guide rail 36, and thereby moving the windowpane 25 up or down with the carrier 33.

Now, with reference to FIGS. 3, 4, 5, 6 and 7A to 7F, the automotive windowpane support structure 20 provided at the left automotive door 11 will be described. In particular, the rear sash portion 23, the rear rail member 24 and the rear slider 49 of the automotive windowpane support structure 20 provided at the left automotive door 11 will be described. The front sash portion 21, the front rail member 22 and the front slider 48 of the automotive windowpane support structure 20 provided at the left automotive door 11 are configured the same as the rear sash portion 23, the rear rail member 24 and the rear slider 49, and therefore these components will not be described in detail.

Figure 3:
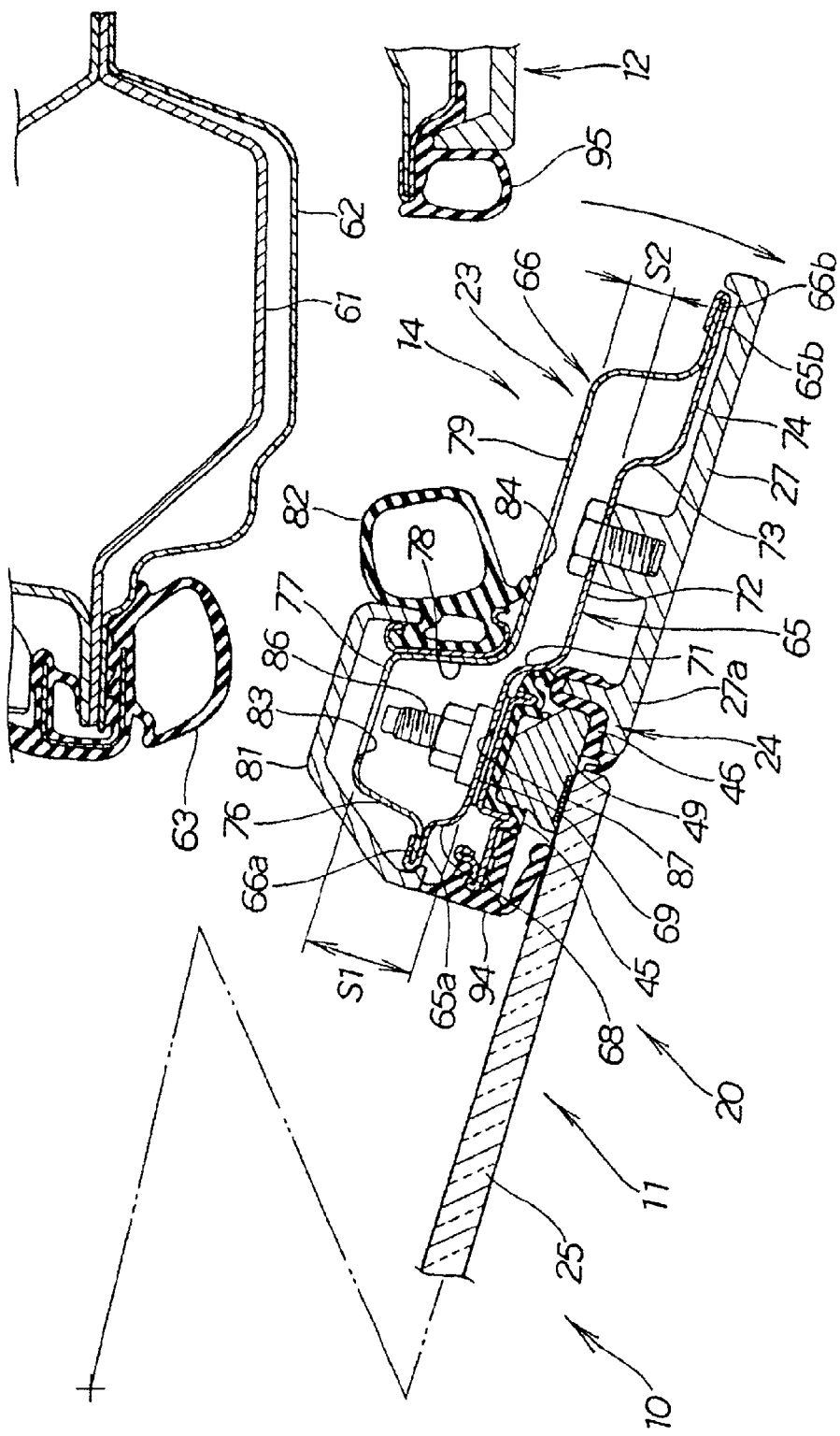
FIG. 3 is a cross-sectional view illustrating the windowpane support structure with an automotive door shown in FIG. 1 opened.

FIG. 3 illustrates a state where the automotive door 11 is largely opened as shown by an arrow.

The outside of a body center pillar 61 is covered by a lining 62. Front and rear seals 63 are attached to the front and rear edges of the body center pillar 61 (the seal at the rear edge not shown).

The rear sash portion 23 of the automotive door window sash 14 is formed by firmly attaching a front edge portion 65a of an outer sash portion 65 and a front edge portion 66a of an inner sash portion 66 together and firmly attaching a rear edge portion 65b of the outer sash portion 65 and a rear edge portion 66b of the inner sash portion 66 together. The rear sash portion 23 thus forms a closed cross section.

The outer sash portion 65 has an outer front flat portion 69 provided rearward of the front edge portion 65a with a first outwardly inclined portion 68 therebetween, an outer middle flat portion 72 provided rearward of the outer front flat portion 69 with a second outwardly inclined portion 71 therebetween, and an outer rear flat portion (a rear flat portion of the outer sash portion 65) 74 provided rearward of the outer middle flat portion 72 with a third outwardly inclined portion 73 therebetween.

The inner sash portion 66 has an inner front flat portion 77 opposite to the outer front flat portion 69, provided rearward of the front edge portion 66a with an inwardly inclined portion 76 therebetween, and an inner flat portion 79 opposite to the outer middle flat portion 72 and the outer rear flat portion 74, provided rearward of the inner front flat portion 77 with an outwardly inclined portion 78 therebetween.

A space S1 is provided between the outer front flat portion 69 and the inner front flat portion 77. A space S2 is provided between the outer middle flat portion 72 and the inner flat portion 79.

The inner sash portion 66 is provided with a lining 81 covering the front edge portion 66a, inwardly inclined portion 76 and inner front flat portion 77. A seal 82 is provided on the outwardly inclined portion 78.

As described above, the space S1 is provided between the outer front flat portion 69 and the inner front flat portion 77 and the space S2 is provided between the outer middle flat portion 72 and the inner flat portion 79, whereby the rigidity of the rear sash portion 23 can be ensured.

A seal 95 is provided on the front edge of the automotive door (left rear side door) 12.

Figure 4:
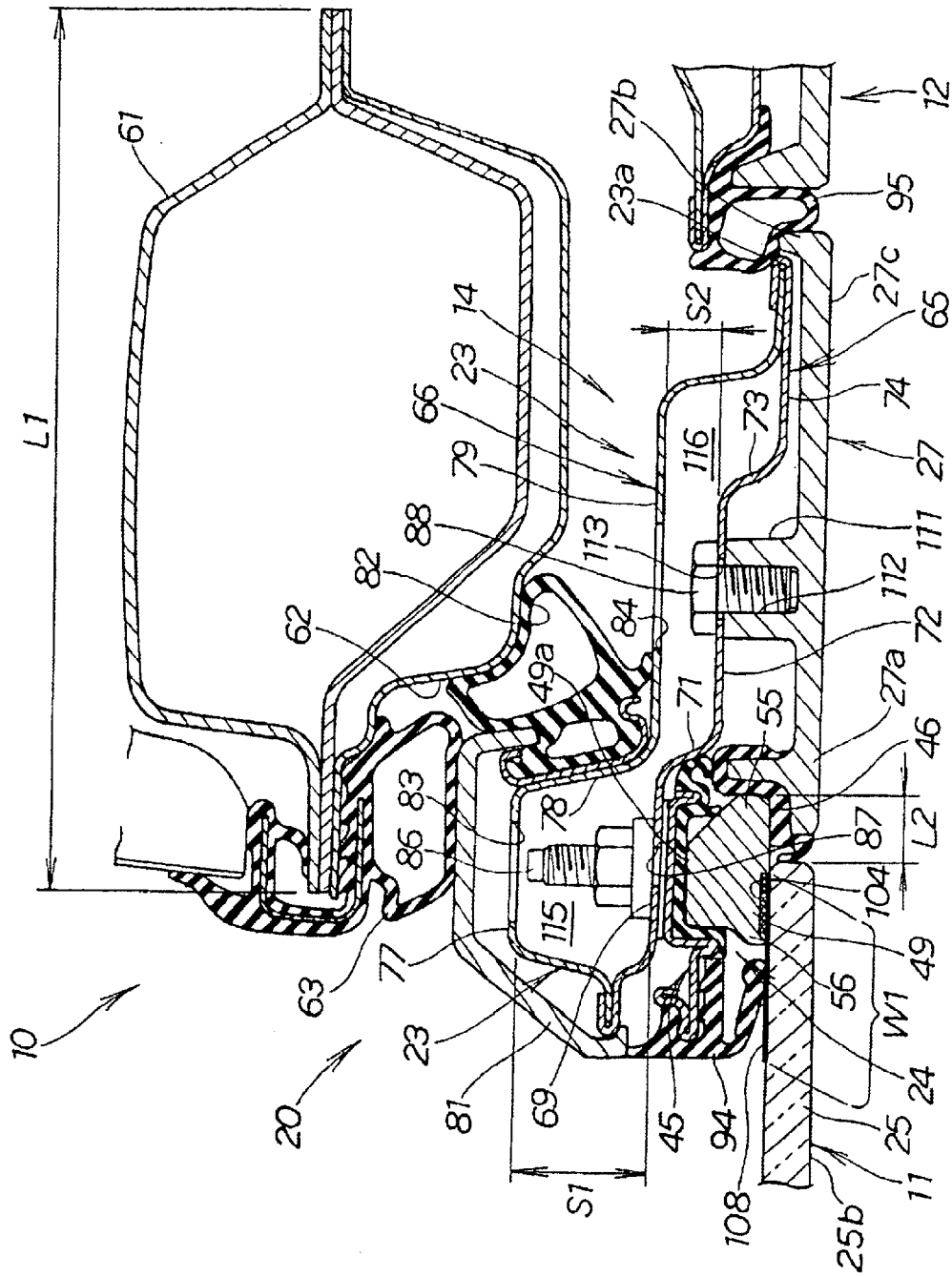
FIG. 4 is a cross-sectional view taken along line 4—4 in FIG. 1.

FIG. 4 illustrates a state where the automotive door 11 is closed.

The lining 81 of the inner sash portion 66 abuts on the seal 63 of the body center pillar 61. The seal 82 of the inner sash portion 66 abuts on the lining 62 of the body center pillar 61. A rear edge portion 27b of the rear garnish 27 and a rear edge portion 23a of the rear sash portion 23 abut on the seal 95 provided on the front edge of the automotive door (left rear side door) 12.

A first insertion hole 83 is formed in the inner front flat portion 77 of the inner sash portion 66, and a second insertion hole 84 is formed in the inner flat portion 79.

A through hole 87 is formed in the outer front flat portion 69 of the outer sash portion 65 for inserting a stud bolt 86 therethrough. The rear inner guide 45 is mounted to the outer front flat portion 69 via the stud bolt 86.

With the rear slider 49 put against the rear inner guide 45, and with the rear outer guide 46 of the rear garnish 27 then put against the slider 49, the rear garnish 27 is mounted to the outer middle flat portion 72 of the outer sash portion 65 with a bolt 88. The rear inner guide 45 and the rear outer guide 46 constitute the rear rail member 24.

The outer sash portion 65 of the rear sash portion 23 has the outer middle flat portion 72 and the outer rear flat portion 74 extended rearward of the outer front flat portion 69. The inner flat portion 79 is extended rearward of the inner front flat portion 77.

The rear garnish 27 is substantially centrally provided with a boss 111. A threaded hole 112 is formed in the boss 111. The rear garnish 27 is put over the outer sash portion 65 and the boss 111 is put on the outer middle flat portion 72.

With this state, the threaded hole 112 of the boss 111 is aligned with the through hole 113 of the outer middle flat portion 72, and the bolt 88 is inserted through the second insertion hole 84 of the inner sash portion 66 into the second space 116 within the rear sash portion 23 and then screwed into the threaded hole 112 through the through hole 113.

In this manner, the rear garnish 27 is mounted to the outer sash portion 65. The rear garnish 27 is mounted to the outer sash portion 65 so as to cover the rear half of the outer front flat portion 69, the outer middle flat portion 72 and the outer rear flat portion 74.

As described above, the rear sash portion 23 is extended rearward, and the rearward extended portion of the rear sash portion 23 is concealed by the rear garnish 27, whereby the body center pillar 61 formed large in width L1 can still be concealed by the rear garnish 27. Thus, the width L1 of the body center pillar 61 can be made larger to increase the automobile body strength.

In addition, when the rear garnish 27 is mounted to the outer sash portion 65, an outer surface 27c of the rear garnish 27 is flush with an outer surface 25b of the windowpane 25. Thus, the appearance of the automobile 10 can be further improved.

The rear outer guide 46 is provided at the rear garnish 27 so as to support the rear slider side portion 55 of the rear slider 49 protruded from the edge of the windowpane 25. As a result, the rear slider side portion 55 protruded from the edge of the windowpane 25 can be concealed by the rear garnish 27. The rear slider side portion 55 can thus be made invisible from outside to further improve the appearance.

Figure 5:
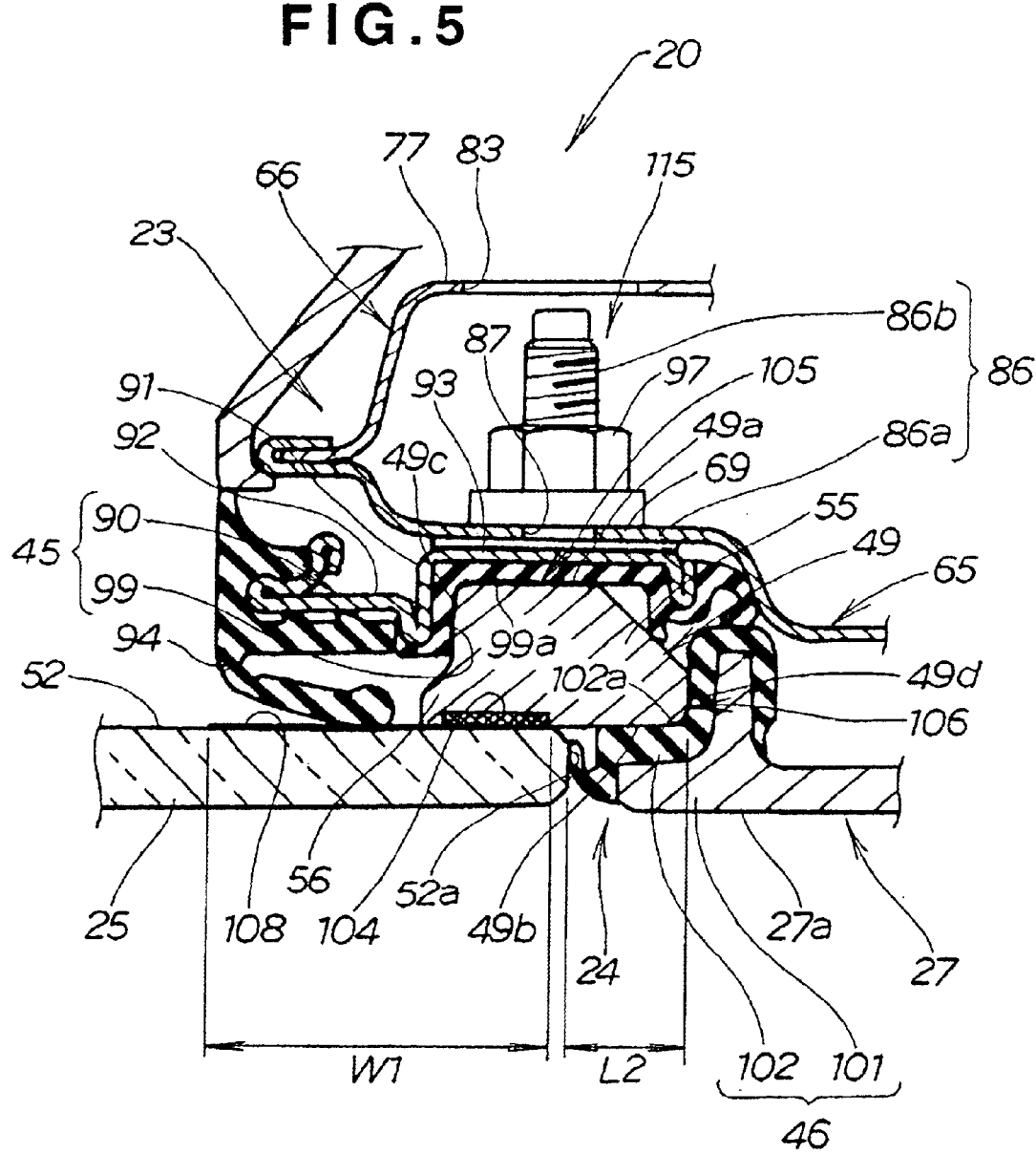
FIG. 5 is an enlarged cross-sectional view of the support structure shown in FIG. 4 with a slider centered.

FIG. 5 illustrates in enlargement the rear slider 49 and the surroundings shown in FIG. 4.

The rear inner guide 45 includes a base 90 and an inner sliding layer 99 integrally formed with the base 90. The inner sliding layer 99 is made from a resin material or rubber material, for example. The base 90 includes a guide portion 91 of a substantially U-shaped cross section and a projecting portion 92 projecting forward from the guide portion 91. The inner sliding layer 99 is mostly provided within the guide portion 91. A seal 94 is provided on the projecting portion 92.

The rear outer guide 46 includes an L-shaped guide portion 101 formed on the inside of a front edge portion 27a of the rear garnish 27, and an outer sliding layer 102 provided on the guide portion 101. The outer sliding layer 102 is made from a resin material or rubber material, for example.

The rear outer guide 46 and the rear inner guide 45 constitute the rear rail member 24. In the rear rail member 24, the rear slider 49 is vertically movably disposed.

A head 86a of the stud bolt 86 is bonded to a guide bottom 93 of the guide portion 91 of the base 90 by an adhesive, for example. A threaded portion 86b of the stud bolt 86 is inserted through the through hole 87 of the outer sash portion 65, and is protruded into a first space 115 between the outer sash portion 65 and the inner sash portion 66.

A nut 97 is inserted through the first insertion hole 83 of the inner front flat portion 77 of the inner sash portion 66. The nut 97 is screwed onto the threaded portion 86b of the stud bolt 86, thereby to fix the rear inner guide 45 to the outer front flat portion 69 of the outer sash portion 65.

In other words, the guide bottom 93 of the guide portion 91 constituting a part of the base 90 of the rear inner guide 45 is superimposed on the outer sash portion (sash portion) 65, and the superimposed portion is fixed thereto.

In this manner, the guide bottom 93 of the guide portion 91 constituting a part of the base 90 of the rear inner guide 45 is fixed to the rear sash portion 23, which eliminates the need for projecting a mounting portion from the side of an inner guide and projecting a sash portion opposite to the mounting portion as in a conventional art. As a result, a concealing portion 108 provided on the rear inner edge surface 52 of the windowpane 25 for the rear sash portion 23 can have a reduced width W1.

The rear slider 49 includes the rear bonded portion 56 and the side portion 55 as shown in FIG. 2. The rear slider 49 has the rear bonded portion 56 bonded to the rear inner edge surface 52 of the windowpane 25 (specifically, to the concealing portion 108) with an adhesive 104, and the side portion 55 protruded rearward from a rear edge 52a of the windowpane 25 by a dimension L2.

The rear slider 49 is formed in a substantially pentagonal cross-sectional shape, having an inwardly projecting corner 105 formed by an inner surface 49a and a front surface 49c, and an outwardly projecting corner 106 formed by an outer surface 49b and a rear surface 49d.

Since the rear slider 49 is attached to the rear inner edge surface 52 of the windowpane 25 with the adhesive 104, there is no need to mount the rear slider 49 to the windowpane 25 with a bolt. This eliminates the need for exposing a bolt head at the outer surface of the windowpane 25, preventing the generation of hissing sounds due to a bolt head, and improving the appearance.

The inner surface 49a of the rear slider 49 is put against the inner sliding layer 99 of the rear inner guide 45, and the rear outer guide 46 is put on the outer surface 49b of the rear slider 49, so that the rear slider 49 is slidably sandwiched between the rear inner guide 45 and the rear outer guide 46.

Now, the structure of supporting the rear slider 49 with the rear inner guide 45 and the rear outer guide 46 will be described.

The inwardly projecting corner 105 of the rear slider 49 is supported on a substantially L-shaped inwardly depressed corner 99a of the inner sliding layer 99 of the rear inner guide 45. The outwardly projecting corner 106 of the rear slider 49 is supported on a substantially L-shaped outwardly depressed corner 102a of the outer sliding layer 102 of the rear outer guide 46.

Thus, the rear inner guide 45 and the rear outer guide 46 sandwich the rear slider 49 on its inner and outer surfaces 49a, 49b and also on its front and rear surfaces 49c, 49d The rear rail member 24 restricts the movement of the rear slider 49 in automobile longitudinal and transverse (lateral) directions.

The concealing portion 108 is formed by applying, for example, black ceramic to the rear inner edge surface 52 of the windowpane 25. The concealing portion 108 conceals the rear slider 49 and the seal 94 from view from outside.

The concealing portion 108 may alternatively be formed by a glass laminate including an opaque colored film or the like as a windowpane intermediate film, or may be formed by attaching a film in black color or the like to the windowpane surface by printing or the like.

The side portion 55 protruded rearward from the rear edge 52a of the inner surface 25a of the windowpane 25 by the dimension L2 (hereinafter referred to as a "protruded side portion") is covered by the rear outer guide 46, that is, the front edge portion 27a of the rear garnish 27 so that the protruded side portion 55 is concealed from view from outside. In this manner, the rear slider 49 in its entirety can be concealed from view from outside of the automobile body.

Now, the method of producing the rear inner guide 45 will be described with reference to FIG. 6.

A roll 120 of a strip-shaped steel plate 121 wound around a core 122 is placed in a feeding machine (not shown) to feed the steel plate 121 in a flattened state.

The fed flattened steel plate 121 is cut in a cutting position 123 (shown by imaginary lines) to obtain a blank 124 of a predetermined length. The blank 124 is placed in a press-forming machine 125.

A moving die half 126 of the press-forming machine 125 is lowered as shown by arrows (1) to press-form the blank 124 between a fixed die half 127 and the moving die half 126 into a desired shape, that is, a base 90.

The resultant base 90 is put through a cavity (not shown) of an extrusion machine 128. At that time, molten resin within a hopper 129 is extruded by an injecting means 131 to be fed into the cavity of the extrusion machine 128.

The molten resin fed into the cavity is attached to a predetermined portion of the base 90 passing through the cavity and is formed into a desired shape by the cavity of the extrusion machine 128.

The molten resin attached to the base 90 forms an inner sliding layer 99 on a guide portion 91 of the base 90 and the like. The production of the rear inner guide 45 is thus completed.

After the completion of production of the rear inner guide 45, a stud bolt 86 (see FIG. 4) is bonded with an adhesive to a guide bottom 93 of the guide portion 91 of the rear inner guide 45.

In this manner, the inner sliding layer 99 is formed on the guide portion 91 of the base 90 and the like when the base 90 is put through the extrusion machine 128, resulting in simplified equipment and a simplified production process.

As a conventional production method of forming the inner sliding layer 99 on the guide portion 91 of the base 90 and the like, an insert molding is known, for example. To implement the insert molding, however, it is required to prepare a large insert mold for accommodating the base 90 in its entirety, resulting in an increase in the equipment size.

In addition, when using the insert mold, there are additional steps of clamping and opening the insert mold, resulting in a complicated production process.

Figure 6:
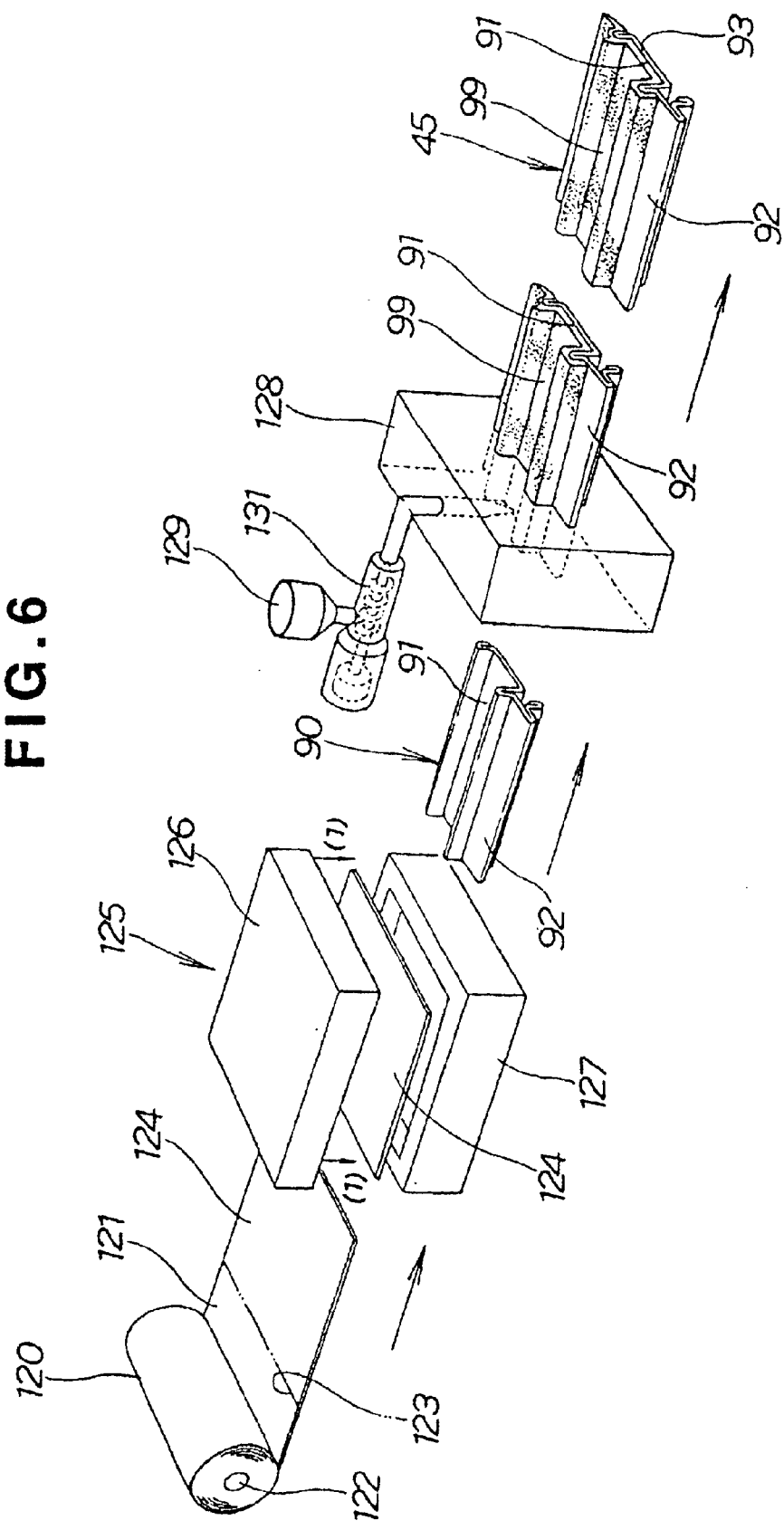
FIG. 6 is a diagram illustrating the process of producing a rear inner guide shown in FIG. 5.

To avoid this, this embodiment adopts the production method shown in FIG. 6.

Although the description has been made with FIG. 6 on the example of forming the base 90 from a steel blank, it is also possible to form the base 90 from other material such as aluminum. Also, in place of the press-forming machine 125, a roll forming machine may be used.

Now, the process of assembling the automotive windowpane support structure 20 will be described with reference to FIGS. 7A to 7F.

Figure 7A:
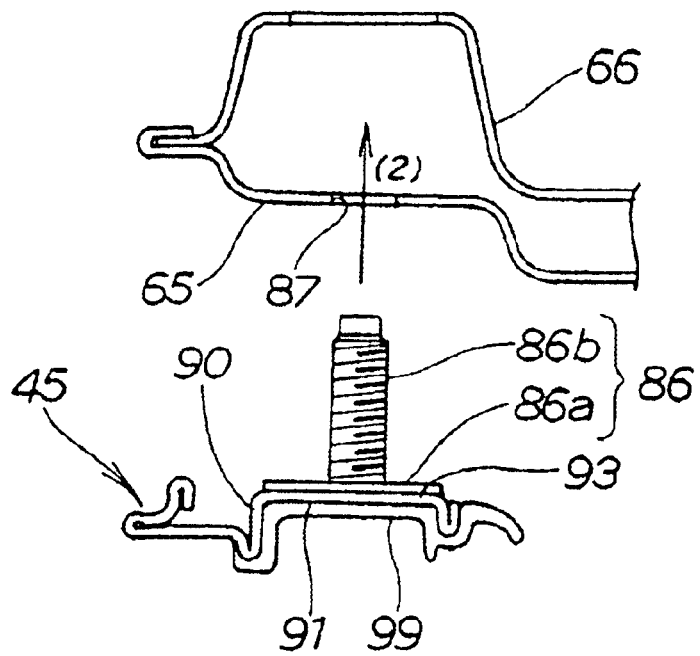

In FIG. 7A, after the production of the rear inner guide 45 by forming the inner sliding layer 99 on the guide portion 91 of the base 90, the head 86*a* of the stud bolt 86 is bonded to the guide bottom 93 of the guide portion 91 with an adhesive, for example.

Then, the threaded portion 86*b* of the stud bolt 86 is inserted through the through hole 87 of the outer sash portion 65 as shown by arrow (2).

Figure 7B:
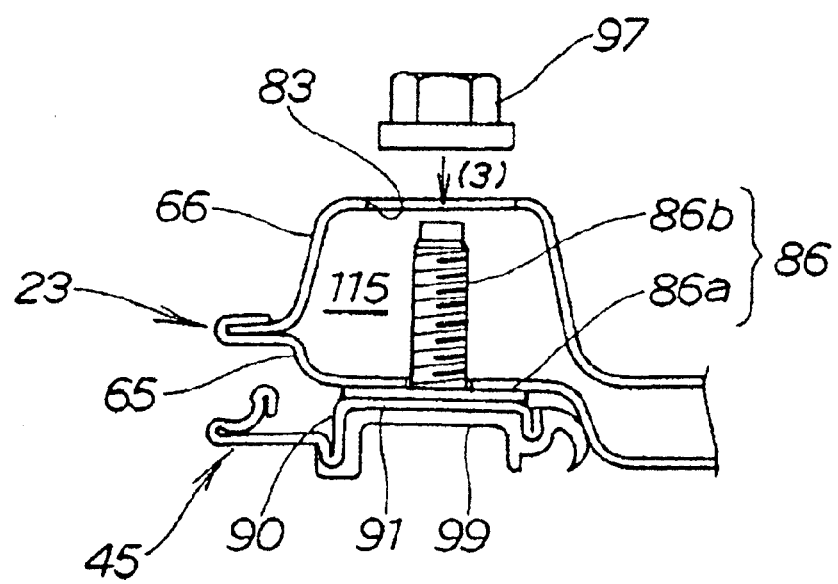

In FIG. 7B, the threaded portion 86*b* of the stud bolt 86 is projected into the first space 115 between the outer sash portion 65 and the inner sash portion 66.

Then, the nut 97 is inserted through the first insertion hole 83 of the inner sash portion 66 as shown by arrow (3).

Figure 7C:
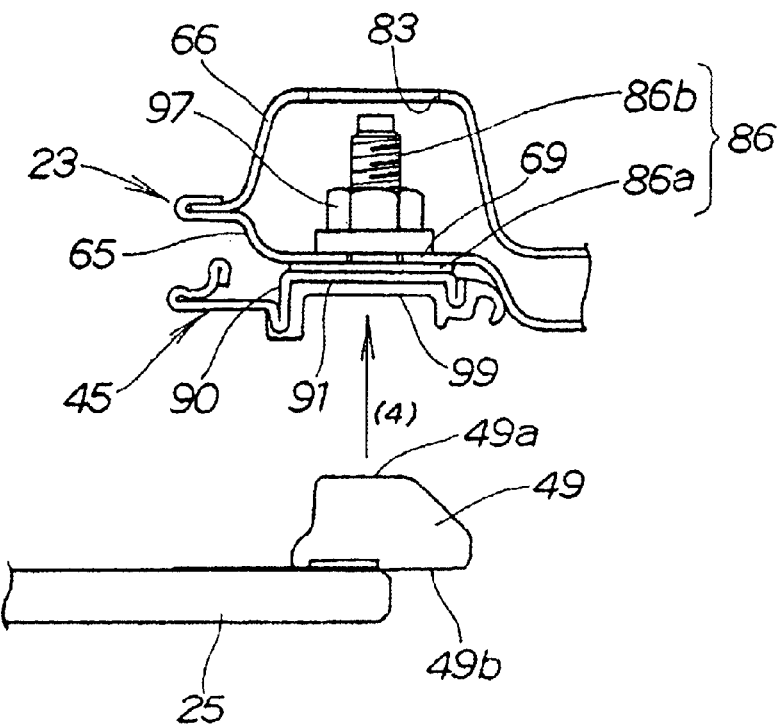

In FIG. 7C, the nut 97 is screwed onto the threaded portion 86*b* of the stud bolt 86 to fix the rear inner guide 45 to the outer front flat portion 69 of the outer sash portion 65.

Then, the inner surface 49*a* of the rear slider 49 is put on the inner sliding layer 99 of the rear inner guide 45 as shown by arrow (4).

Figure 7D:
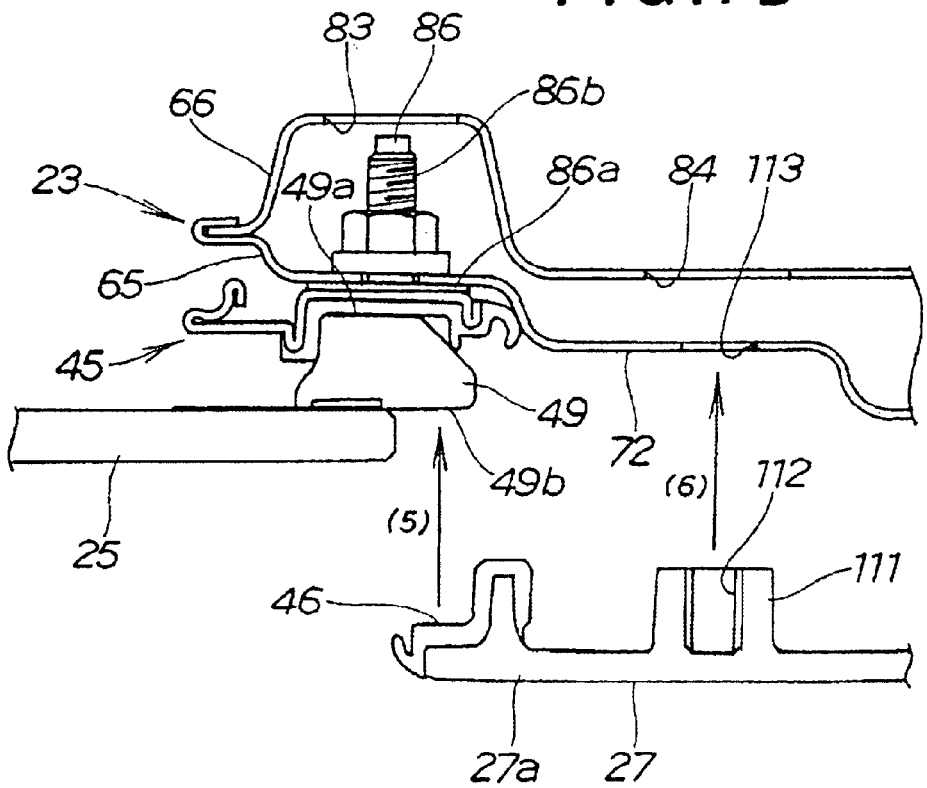

In FIG. 7D, the rear outer guide 46 provided at the front edge portion 27*a* of the rear garnish 27 is moved toward the outer surface 49*b* of the rear slider 49 as shown by arrow (5), and the boss 111 of the rear garnish 27 is moved toward the through hole 113 of the outer sash portion 65 as shown by arrow (6).

Figure 7E:
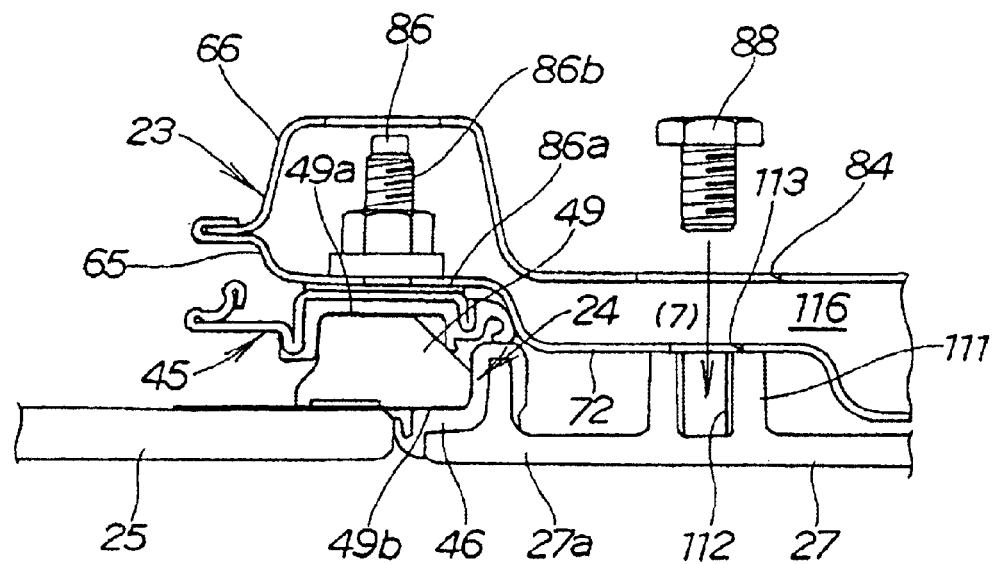

In FIG. 7E, with the threaded hole 112 of the boss 111 aligned with the through hole 113 of the outer middle flat portion 72, the bolt 88 is inserted through the second insertion hole 84 of the inner sash portion 66 into the second space 116 within the rear sash portion 23 as shown by arrow (7). The inserted bolt 88 is screwed into the threaded hole 112 through the through hole 113 of the outer sash portion 65.

Figure 7F:
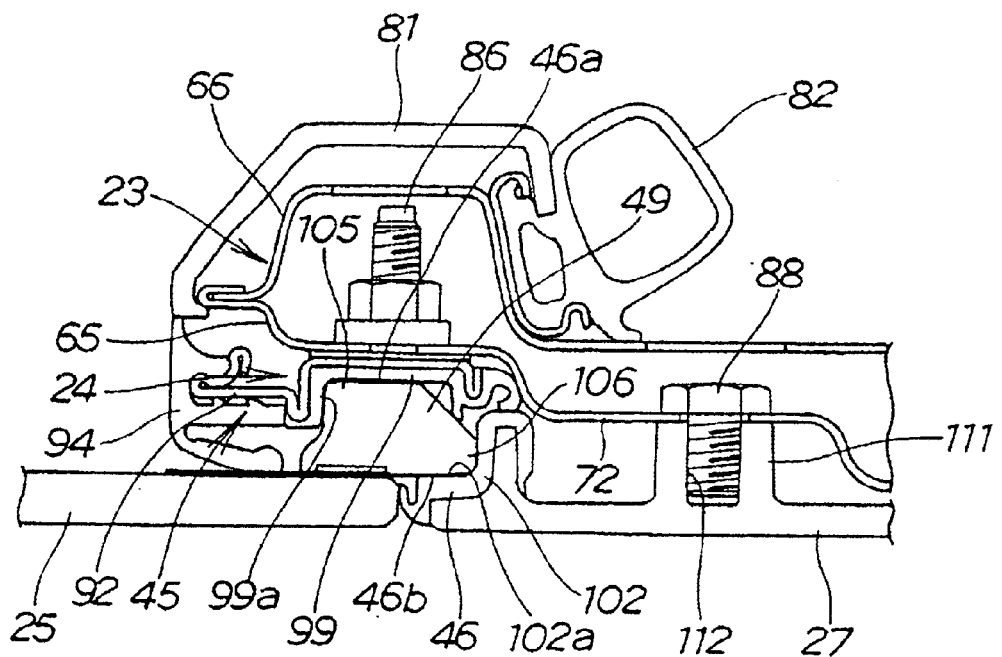

In FIG. 7F, the rear garnish 27 is mounted to the outer sash portion 65, and the slider 49 is slidably sandwiched between the rear inner guide 45 and the rear outer guide 46. Specifically, the inwardly projecting corner 105 of the rear slider 49 is supported on the substantially L-shaped inwardly depressed corner 99*a* of the inner sliding layer 99 of the rear inner guide 45, and the outwardly projecting corner 106 of the rear slider 49 is supported on the substantially L-shaped outwardly depressed corner 102*a* of the outer sliding layer 102 of the rear outer guide 46.

As a result, the rear rail member 24 consisting of the rear inner guide 45 and the rear outer guide 46 restricts the movement of the rear slider 49 in automobile longitudinal and transverse (lateral) directions.

Then, the lining 81 and the seal 82 are attached to the inner sash portion 66, and the seal 94 is attached to the projecting portion 92 of the rear inner guide 45.

As described above, the rear rail member 24 is comprised of the rear inner guide 45 and the rear outer guide 46. The rear inner guide 45 is provided at the rear sash portion 23, and the rear outer guide 46 is provided at the rear garnish 27. The mounting of the rear garnish 27 thus allows the rear slider 49 to be supported from inside and outside between the rear inner guide 45 and the rear outer guide 46.

The division of the rear rail member 24 into two parts, the rear inner guide 45 and the rear outer guide 46, allows the rear slider 49 to be easily fitted in the rear rail member 24 with little effort, facilitating the assembly operation.

Figure 8:
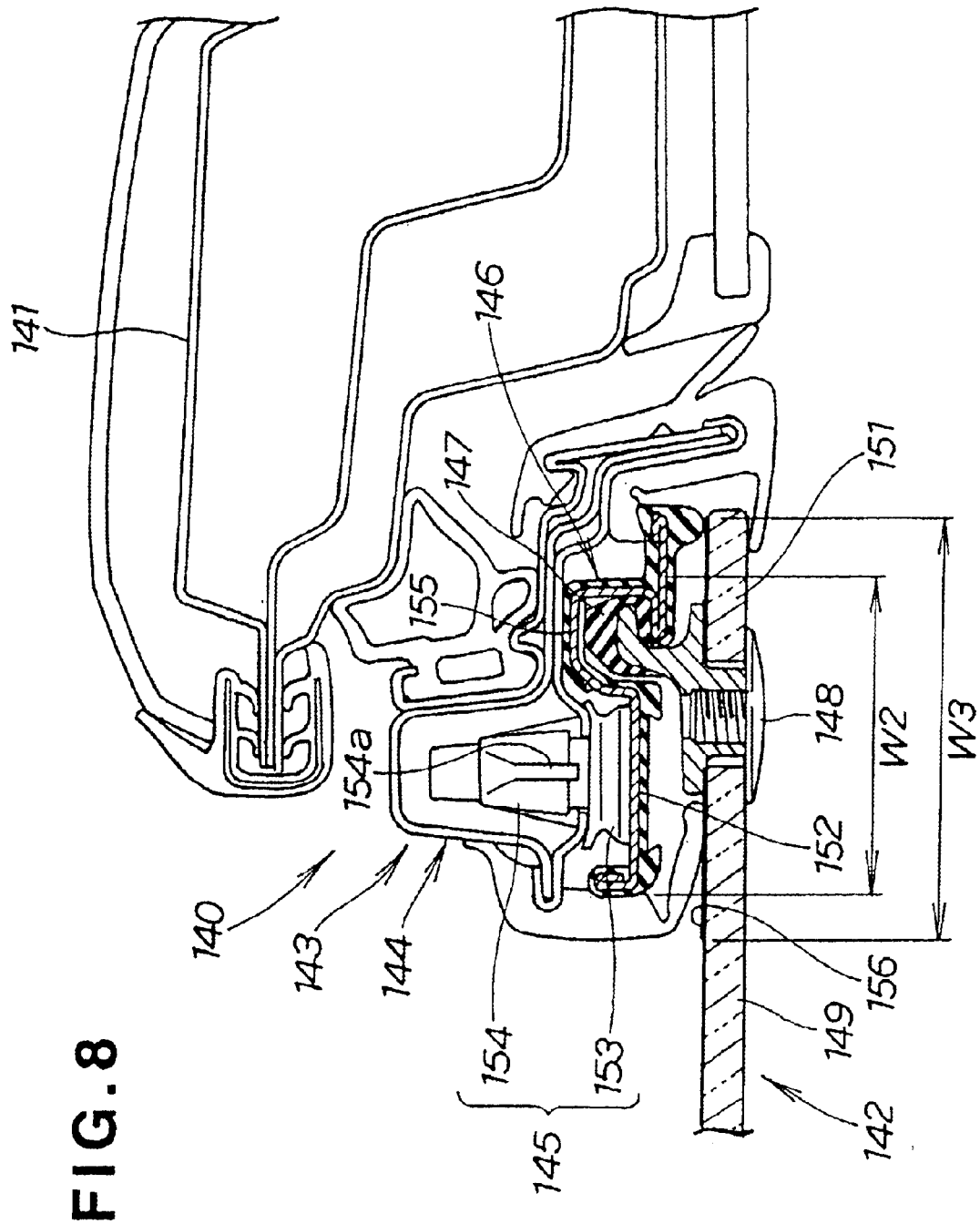
FIG. 8 is a cross-sectional view illustrating a comparative example with respect to the first embodiment.

FIG. 8 is a cross-sectional view of a comparative example with respect to the automotive windowpane support structure 20 according to the first embodiment, illustrating the comparative example of using a bar member as a slider.

An automotive windowpane support structure 140 in the comparative example has a window sash 143 in an automotive door front side door) 142 provided forward of a body center pillar 141, a rail member 146 mounted to a sash portion 144 of the window sash 143 with a clip (fastening member) 145, and a slider 147 fitted in the rail member 146.

The slider 147 is mounted to a rear edge portion 151 of a windowpane 149 via a bolt 148.

To mount the rail member 146 to the sash portion 144 with the clip 145, it is necessary to provide a mounting portion 152 to the rail member 146 and to fix a head 153 of the clip 145 to the mounting portion 152. More specifically, the mounting portion 152 is projected forward from a guide portion 155 of the rail member 146, and the head 153 of the clip 145 is fixed to the mounting portion 152. Since the head 153 of the clip 145 has a relatively large shape, it is necessary to provide a large width to the mounting portion 152.

As a result, the rail member 146 has a large width W2. In addition, since a leg 154 of the clip 145 is inserted into a mounting hole of the sash portion 144 and the clip 145 is fixed to the sash portion 144 with a locking claw 154*a* at the leg 154, it is necessary to project the sash portion 144 forward in conformity with the mounting portion 152.

To conceal the rail member 146 and the sash portion 144, it is necessary to provide a concealing portion 156 with a large width W3.

The clip 145 is a commonly used clip, and is inserted at the leg 154 into the mounting hole of the sash portion 144 and fixed at the locking claw 154*a* of the leg 154 to the sash portion 144.

By contrast, in the windowpane support structure 20 in the first embodiment shown in FIG. 5, the guide bottom 93 of the guide portion 91 constituting a part of the base 90 of the rear inner guide 45 is superimposed on the outer sash portion 65, and the superimposed portion is fixed thereto. There is no need to project the mounting portion 152 forward like the rail member 146 in the comparative example shown in FIG. 8, and to project the sash portion 144 forward in conformity with the projected mounting portion 152. This embodiment can reduce the width W1 of the concealing portion 108 on the rear inner edge surface 52 of the windowpane 25 for the rear sash portion 23.

Figure 9:
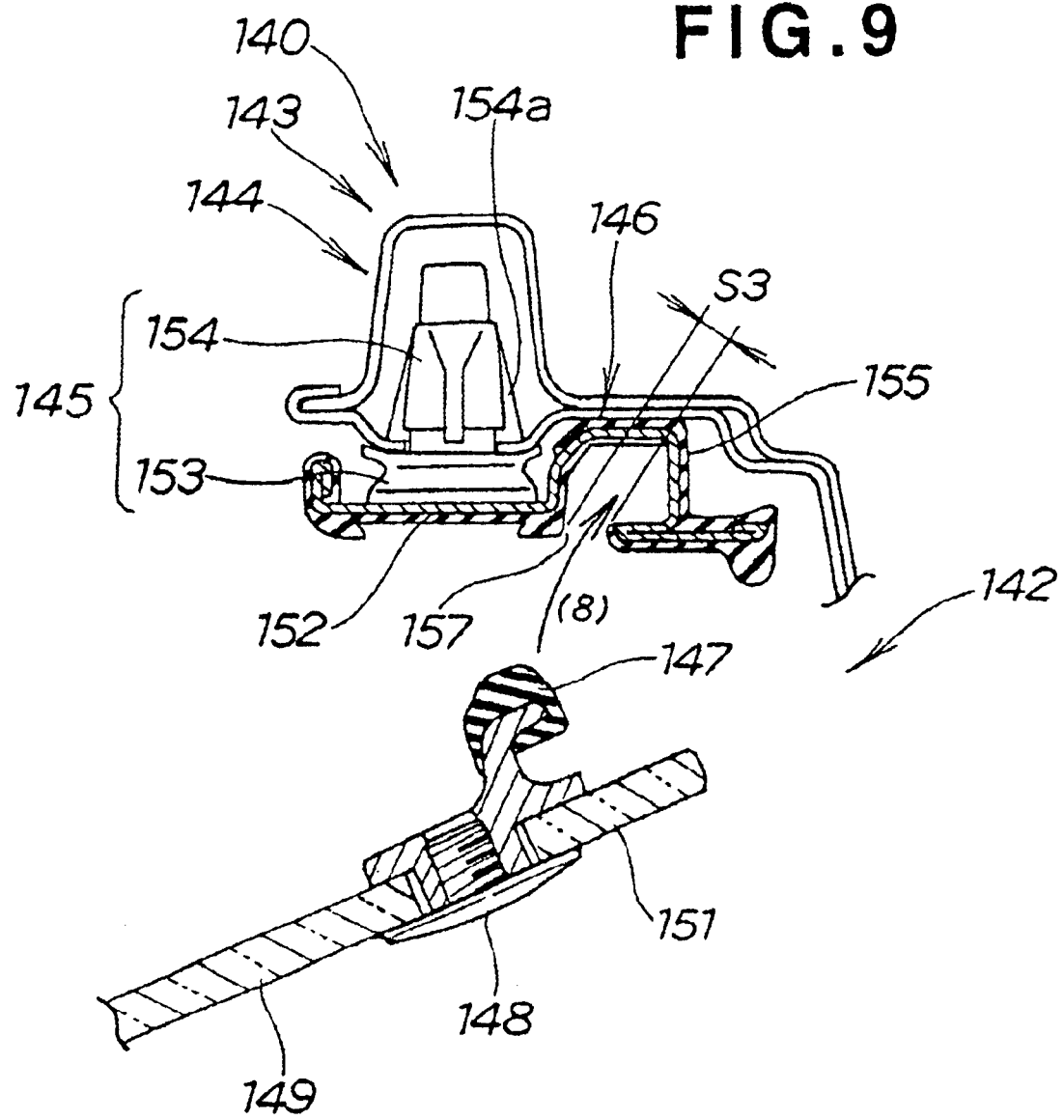
FIG. 9 is a diagram illustrating the assembling of a support structure in the comparative example shown in FIG. 8.

FIG. 9 exemplarily illustrates the assembling the windowpane support structure 140 in the comparative example shown in FIG. 8.

In the automotive windowpane support structure 140 in the comparative example, the width S3 of an opening 157 of the guide portion 155 is made smaller than that of the slider 147 so as to prevent the slider 147 from sliding out of the opening 157. It is thus necessary to put the slider 147 into the guide portion 155 of the rail member 146 through the narrow-width opening 157 as shown by arrow (8) to fit the slider 147 in the guide portion 155.

In this method, however, the slider 147 is forcedly pressed into the narrow-width opening 157, and the operation of fitting the slider 147 in the guide portion 155 of the rail member 146 takes a lot of trouble.

By contrast, in the windowpane support structure 20 in the first embodiment of the invention shown in FIG. 5, the rear rail member 24 is divided into the rear inner guide 45 and the rear outer guide 46. The rear slider 49 can be sandwiched between the rear inner guide 45 and the rear outer guide 46, thereby to be fitted in the rear rail member 24. Thus, the operation of fitting the rear slider 49 in the rear rail member 24 can be easily performed with little effort.

Figure 10:
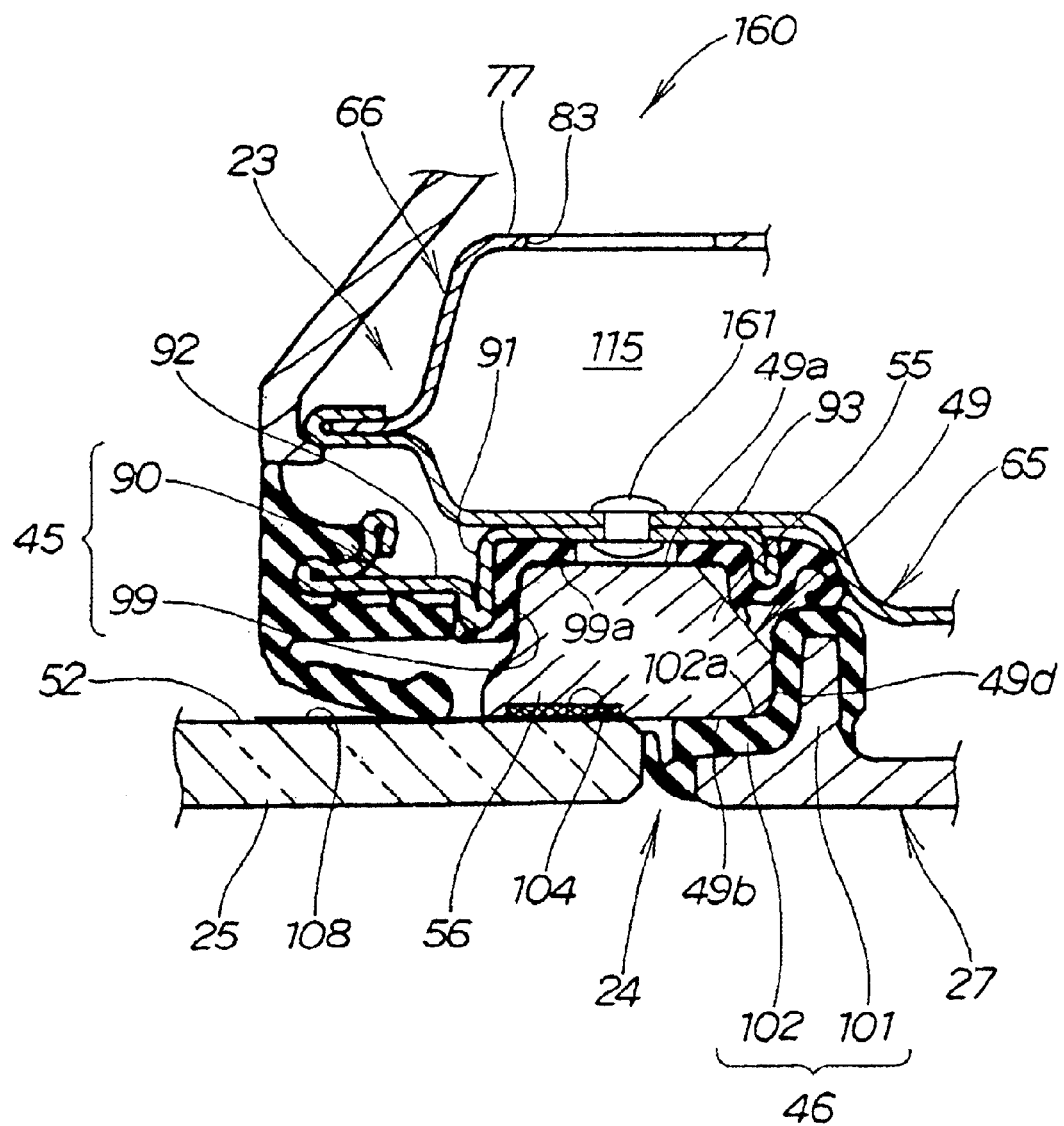
FIG. 10 is a cross-sectional view illustrating a support structure according to a second embodiment of the present invention.

FIG. 10 is a cross-sectional view of an automotive windowpane support structure according to a second embodiment of the present invention. Components identical to those in the first embodiment are given identical reference numerals and will not be described.

An automotive windowpane support structure 160 in the second embodiment is different from that in the first embodiment only in that a rear inner guide 45 of a rear rail member 24 is fixed to an outer sash portion 65 of a rear sash portion 23 with a rivet 161, and is otherwise configured the same as in the first embodiment.

Figure 11:
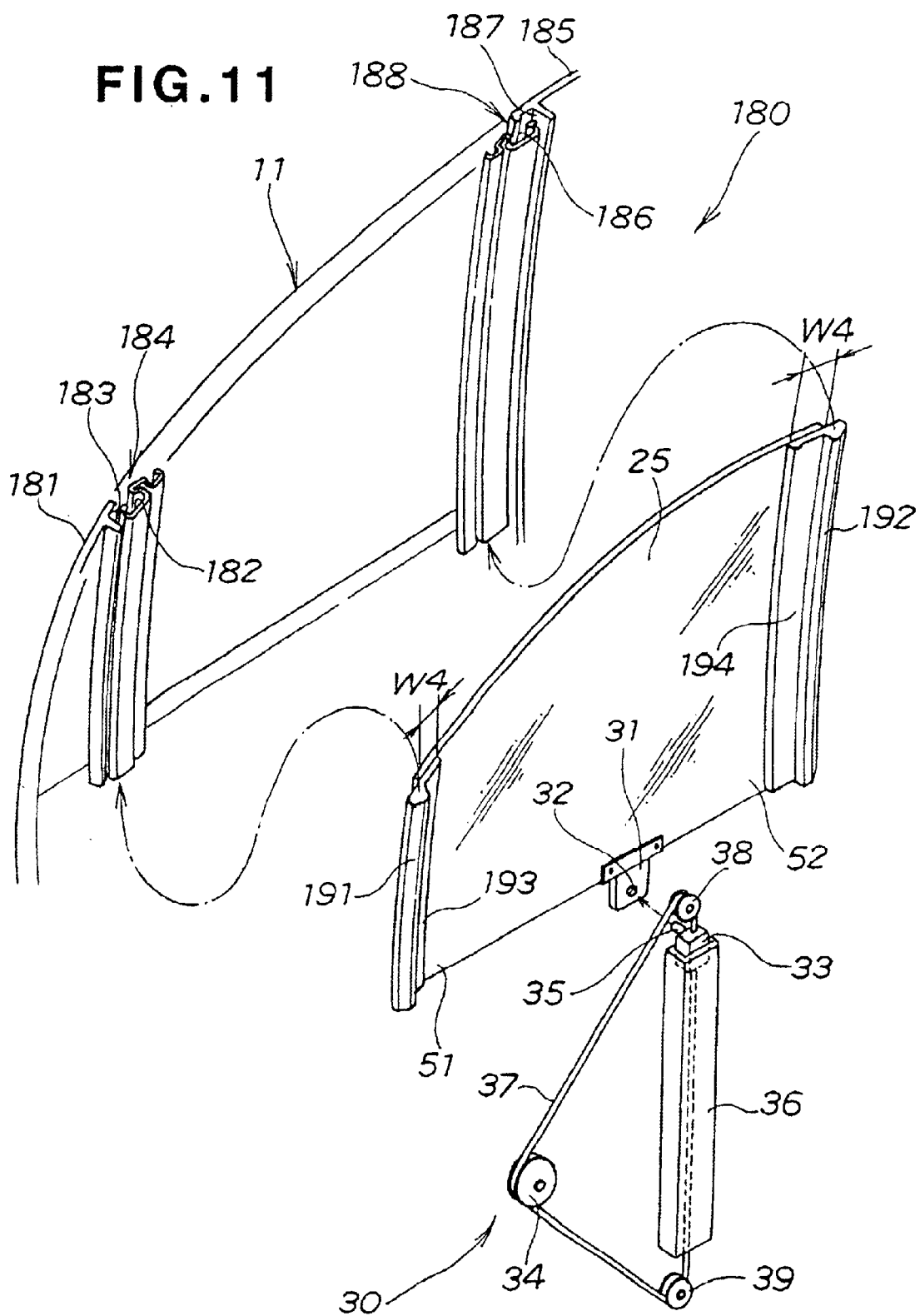
FIG. 11 is an exploded perspective view of a door and a windowpane provided with a support structure according to a third embodiment of the present invention.

FIG. 11 is an exploded perspective view illustrating an automotive windowpane support structure according to a third embodiment of the present invention. Components identical to those in the first embodiment are given identical reference numerals and will not be described.

An automotive windowpane support structure 180 in the third embodiment has a front inner guide (inner guide) 182 provided at the side of a front sash portion 21 (see FIG. 1) opposite to a front garnish 181, and a front outer guide (outer guide) 183 provided at the side of the front garnish 181 opposite to the front inner guide 182, the front outer guide 183 and the front inner guide 182 forming a front rail member (rail member) 184.

A rear inner guide (inner guide) 186 is provided at the side of a rear sash portion 23 (see FIG. 1) opposite to a rear garnish 185, and a rear outer guide (outer guide) 187 is provided at the side of the rear garnish 185 opposite to the rear inner guide 186, the rear outer guide 187 and the rear inner guide forming a rear rail member (rail member) 188.

In the support structure 180, front and rear sliders (sliders) 191, 192 movable along the front and rear rail members 184, 188 are protruded forward and rearward of a windowpane 25, respectively.

A front extending portion (extending portion) 193 extends rearward from the front slider 191 to the rear surface of the windowpane 25. The front extending portion 193 is bonded to a front inner edge surface (inner edge surface) 51 of the windowpane 25.

A rear extending portion (extending portion) 194 extends forward from the rear slider 192 to the rear surface of the windowpane 25. The rear extending portion 194 is bonded to a rear inner edge surface (inner edge surface) 52 of the windowpane 25.

The protruded front and rear sliders 191, 192 are supported by the front and rear rail members 184, 188, thereby to be restricted in movement in automobile longitudinal and transverse directions.

The front slider 191 is a bar member extending vertically along the front inner edge surface (inner edge surface) 51 of the windowpane 25, protruded from the front inner edge surface 51.

The front extending portion 193 is a strip-shaped plate material extending vertically along the front inner edge surface 51 of the windowpane 25 and bonded to the front inner edge surface 51.

The front extending portion 193 made from a strip-shaped plate material has an increased width W4 to provide a large area bonded to the front inner edge surface 51. As a result, the front slider 191 can be firmly attached at the front extending portion 193 to the front inner edge surface 51 of the windowpane 25.

The rear slider 192 is a bar member extending vertically along the rear inner edge surface (inner edge surface) 52 of the windowpane 25, protruded from the rear inner edge surface 52.

The rear extending portion 194 is a strip-shaped plate material extending vertically along the rear inner edge surface 52 of the windowpane 25 and bonded to the rear inner edge surface 52.

The rear extending portion 194 made from a strip-shaped sheet material has an increased width W4 to provide a large area bonded to the rear inner edge surface 52. As a result, the rear slider 192 can be firmly attached at the rear extending portion 194 to the rear inner edge surface 52 of the windowpane 25.

The front and rear sliders 191, 192 of bar members are supported by the front and rear rail members 184, 188. Thus forming the front and rear sliders 191, 192 as bar members makes it possible to provide only one of the sliders 191, 192 on the front or rear inner edge surface 51, 52 of the windowpane 25 to vertically move the windowpane 25 in a stabilized state.

Thus, for example, only supporting the rear slider 192 by the rear rail member 188 allows the windowpane 25 to be moved up and down in a stabilized state. This can eliminate the front slider 191 and the front rail member 184. The number of components of the automotive windowpane support structure 180 can thus be reduced to further facilitate the assembly operation.

A regulator 30 includes a holder 31 mounted to the middle of the lower edge of the windowpane 25, a carrier 33 having a connecting pin 35 fitted into a fitting hole 32 of the holder 31, a guide rail 36 in which the carrier 33 is movably disposed, a wire 37 to which the carrier 33 is connected, and upper and lower guide rollers 38, 39 between which the wire 37 runs via a drum 34.

In the regulator 30, the drum 34 is rotated by a drive motor (not shown) to pull the wire 37, moving the carrier 33 up or down along the guide rail 36, and thereby moving the windowpane 25 up or down with the carrier 33.

Now, with reference to FIGS. 12 to 14, the configuration of the automotive windowpane support structure 180 according to the third embodiment provided at a left automotive door 11 (see FIG. 1) will be described. In particular, the rear sash portion 23, the rear rail member 188 and the rear slider 192 of the support structure 180 provided at the left automotive door 11 will be described.

The front sash portion 21, front rail member 184 and front slider 191 in the third embodiment are configured the same as the rear sash portion 23, rear rail member 188 and rear slider 192, and therefore these components will not be described in detail.

Figure 12:
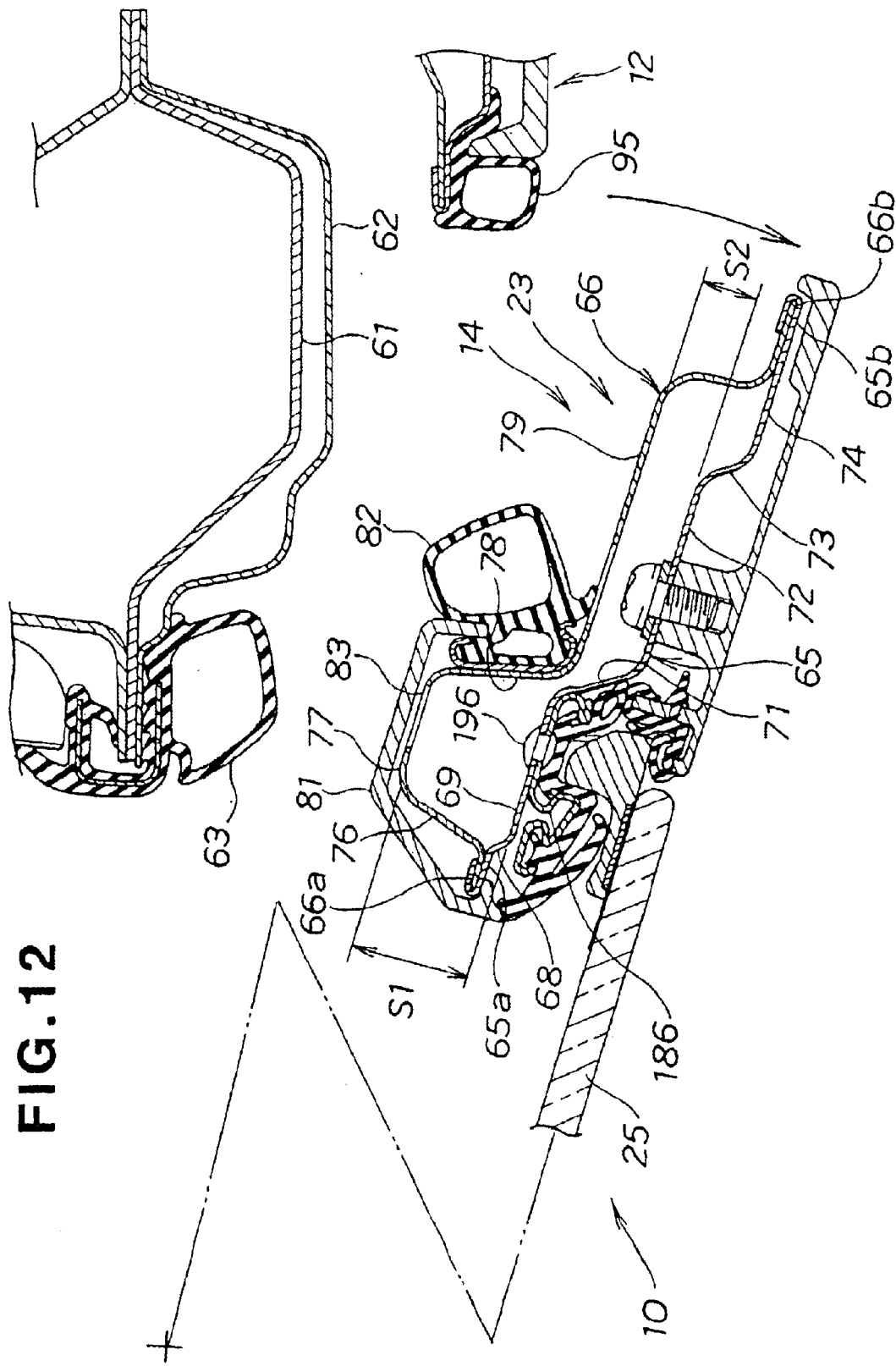
FIG. 12 is a cross-sectional view of an automotive door provided with the support structure according to the third embodiment, illustrating the door in an open state.

FIG. 12 illustrates a state where the automotive door 11 is opened as shown by an arrow.

The outside of a body center pillar 61 is covered by a lining 62. Front and rear seals 63 are attached to the front and rear edges of the body center pillar 61 (the seal at the rear edge not shown).

The rear sash portion 23 of an automotive door window sash 14 is formed by firmly attaching a front edge portion 65a of an outer sash portion 65 and a front edge portion 66a of an inner sash portion 66 together and firmly attaching a rear edge portion 65b of the outer sash portion 65 and a rear edge portion 66b of the inner sash portion 66 together. The rear sash portion 23 thus forms a closed cross section.

The outer sash portion 65 has an outer front flat portion 69 formed rearward of the front edge portion 65a with a first outwardly inclined portion 68 therebetween, an outer middle flat portion 72 formed rearward of the outer front flat portion 69 with a second outwardly inclined portion 71 therebetween, and an outer rear flat portion (a rear flat portion of the outer sash portion 65) 74 formed rearward of the outer middle flat portion 72 with a third outwardly inclined portion 73 therebetween.

The inner sash portion 66 has an inner front flat portion 77 formed rearward of the front edge portion 66a with a inwardly inclined portion 76 therebetween, opposite to the outer front flat portion 69, and an inner flat portion 79 formed rearward of the inner front flat portion 77 with an outwardly inclined portion 78 therebetween, opposite to the outer middle flat portion 72 and the outer rear flat portion 74.

A space S1 is provided between the outer front flat portion 69 and the inner front flat portion 77, and a space S2 is provided between the outer middle flat portion 72 and the inner flat portion 79, so that the rigidity of the rear sash portion 23 is ensured.

The inner sash portion 66 has a lining 81 covering the front edge portion 66a, inwardly inclined portion 76 and inner front flat portion 77, and a seal 82 provided on the outwardly inclined portion 78.

The rear inner guide 186 is mounted to the outer front flat portion 69 with a rivet 196.

The automotive door (left rear side door) 12 has a seal 95 at its front edge.

Figure 13:
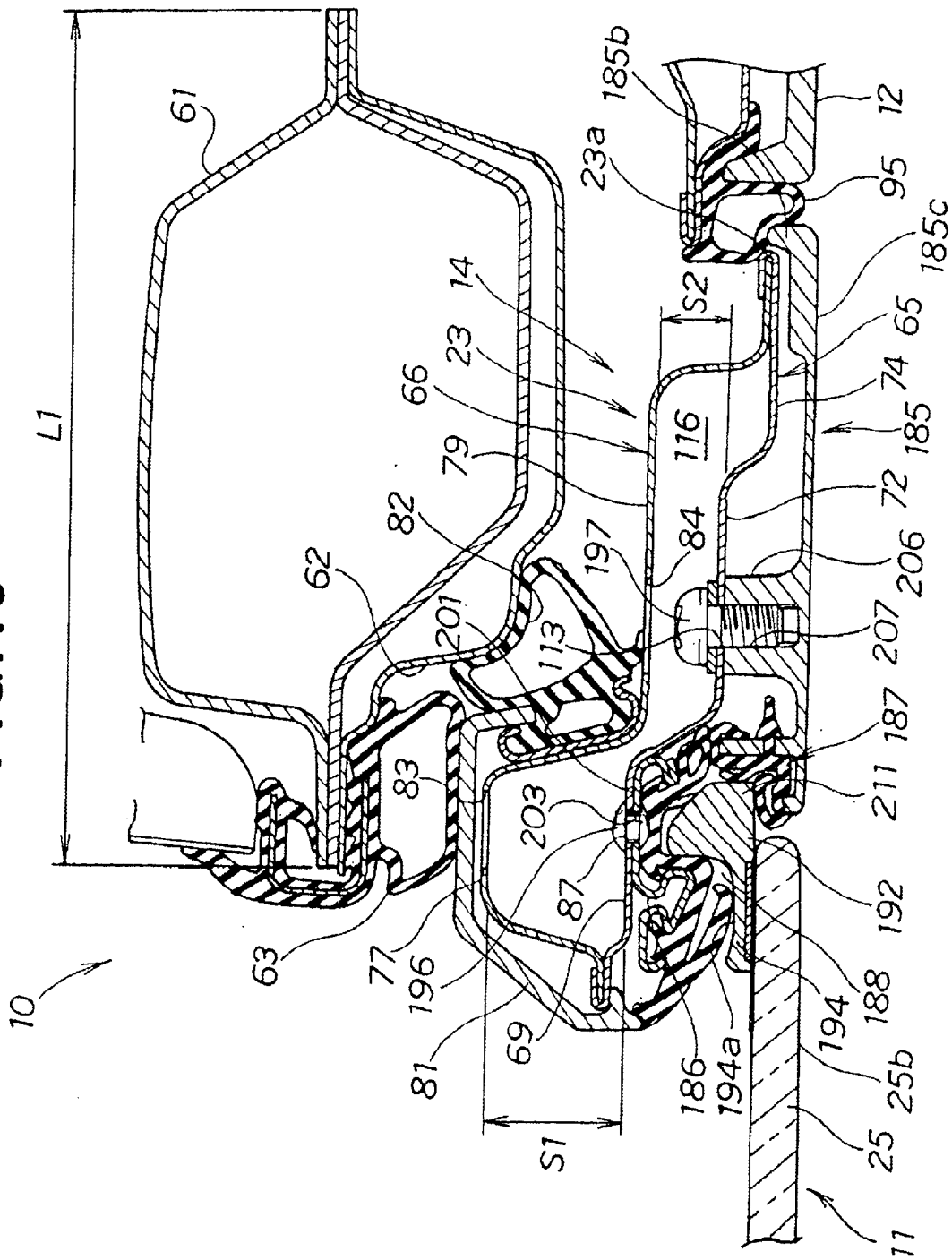
FIG. 13 is a cross-sectional view illustrating the automotive door closed from the state shown in FIG. 12.

FIG. 13 illustrates a state where the automotive door 11 is closed.

The lining 81 of the inner sash portion 66 abuts on the seal 63 of the body center pillar 61. The seal 82 of the inner sash portion 66 abuts on the lining 62 of the body center pillar 61. A rear edge portion 185b of the rear garnish 185 and a rear edge portion 23a of the rear sash portion 23 abut on the seal 95 provided at the front edge of the automotive door (left rear side door) 12.

A first insertion hole 83 is formed in the inner front flat portion 77 of the inner sash portion 66, and a second insertion hole 84 is formed in the inner flat portion 79.

A through hole 87 is formed in the outer front flat portion 69 of the outer sash portion 65, and a through hole 203 is formed in a base 201 of the rear inner guide 186.

The rivet 196 is inserted into the through hole 87 of the outer front flat portion 69 and the through hole 203 of the base 201 to fasten the base 201 to the outer sash portion 65, thereby to mount the rear inner guide 186 to the outer sash portion 65.

The rear slider 192 is put against the rear inner guide 186, and the rear outer guide 187 at the rear garnish 185 is put on the rear slider 192. With this state, the rear garnish 185 is mounted to the outer middle flat portion 72 of the outer sash portion 65 with a bolt 197. The rear inner guide 186 and the rear outer guide 187 constitute the rear rail member 188.

The rear garnish 185 has a boss 206 located substantially centrally. A threaded hole 207 is formed in the boss 206. The rear garnish 185 is put over the outer sash portion 65, and the boss 206 is put on the outer middle flat portion 72.

In this state, the threaded hole 207of the boss 206 is aligned with the through hole 113 of the outer middle flat portion 72, and the bolt 197 is inserted through the second insertion hole 84 of the inner sash portion 66 into the second space 116 within the rear sash portion 23 and then screwed into the threaded hole 207 through the through hole 113.

In this manner, the rear garnish 185 is mounted to the outer sash portion 65. The rear garnish 185 is mounted to the outer sash portion 65 so as to cover the rear half of the outer front flat portion 69, the outer middle flat portion 72 and the outer rear flat portion 74.

As described above, the rear sash portion 23 is extended rearward, and the rearward extended portion of the rear sash portion 23 is concealed by the rear garnish 185, whereby the body center pillar 61 made even larger in width L1 can be concealed by the rear garnish 185. Thus the width L1 of the body center pillar 61 can be made larger to increase the automobile body strength.

In addition, when the rear garnish 185 is mounted to the outer sash portion 65, an outer surface 185c of the rear garnish 185 is flush with an outer surface 25b of the windowpane 25. This results in a further improved appearance of the automobile 10.

The rear outer guide 187 is provided at the rear garnish 185 to support a rear slider side portion 211 of the rear slider 192. Consequently, the rear slider side portion 211 of the rear slider 192 can be concealed by the rear garnish 27. The rear slider side portion 211 can thus be made invisible from outside, further improving the appearance.

Figure 14:
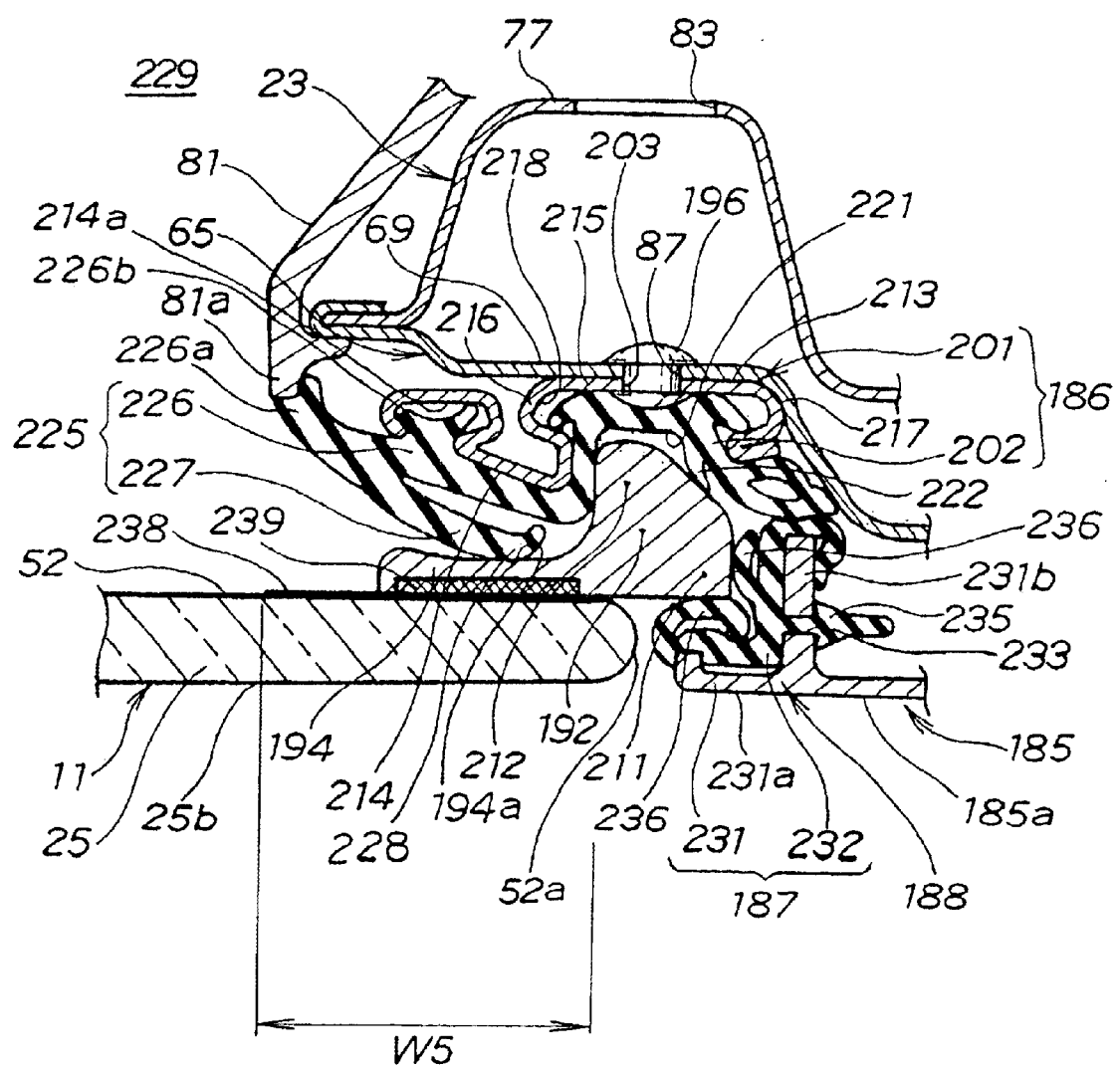
FIG. 14 is an enlarged cross-sectional view of the support structure shown in FIG. 13 with a rear slider centered.

FIG. 14 illustrates in enlargement the rear slider 192 centered and the surroundings shown in FIG. 13.

The rear inner guide 186 includes the base 201 and an inner restriction rubber 202 mounted to the base 201.

The base 201 has a guide portion 213 attached to the outer front flat portion 69 of the outer sash portion 65, and a projecting portion 214 projecting forward from the guide portion 213.

The guide portion 213 has a depressed portion 218 formed by a guide bottom 215 extending along the outer front flat portion 69 of the outer sash 15: portion 65 and front and rear walls 216, 217 extending outward in curves from the front and rear edges of the guide bottom 215. The inner restriction rubber 202 is fitted in the depressed portion 218 of the guide portion 213.

The inner restriction rubber 202 is a resin or rubber member formed in a substantially U shape along the depressed portion 218 of the guide portion 213, having a lip 222 on a depressed inner periphery 221. A seal 225 is integrally formed at the front edge of the inner restriction rubber 202.

The rear outer guide 187 includes a guide portion 231 formed at a front edge portion 185a of the rear garnish 185, and an outer restriction rubber 232 provided on the guide portion 231.

The guide portion 231 is formed in a substantially L shape with a surface portion 231a extending longitudinally and a reinforcing portion 231b extending transversely from the rear edge of the surface portion 231a, and has a insertion hole 233 formed in the reinforcing portion 231b. The outer restriction rubber 232 is provided on the inside of the guide portion 231.

The outer restriction rubber 232 is a substantially L-shaped member made from a resin material or rubber material, for example, and is attached to the guide portion 231 with a locking claw 235 inserted into the insertion hole 233 of the guide portion 231. The outer restriction rubber 232 has a pair of lips 236, 236 at the side opposite to the rear slider side portion 211.

The rear outer guide 187 and the rear inner guide 186 constitute the rear rail member 188. The rear slider 192 is vertically movably disposed within the rear rail member 188.

More specifically, an inside portion 212 of the rear slider 192 is inserted into the depressed inner periphery 221 of the inner restriction rubber 202 to abut on a part of the depressed inner periphery 221 and the lip 202. The rear slider side portion 211 of the rear slider 192 is put against the pair of lips 236, 236 of the outer restriction rubber 232.

In this manner, the rear slider 192 is vertically movably disposed, restricted in movement in automobile longitudinal and transverse directions.

The guide bottom 215 of the guide portion 213 constituting a part of the base 201 is put on the outer front flat portion 69 of the outer sash portion 65, and the rivet 196 is inserted through the through hole 87 of the outer front flat portion 69 and the through hole 203 of the guide bottom 215. The opposite ends of the inserted rivet 196 are beaten down to fix the base 201 to the outer front flat portion 69, thereby to fix the rear inner guide 186 to the outer sash portion (sash portion) 65.

Thus, fixing the rear inner guide 186 to the rear sash portion 23 eliminates the need for projecting a mounting portion from a side portion of an inner guide and projecting a sash portion opposite to the mounting portion as in a conventional manner. Consequently, a concealing portion 238 on a rear inner edge surface 52 of the windowpane 25 for the rear sash portion 23 can be reduced in width W5.

The rear slider 192 is a bar member including the rear slider side portion 211 and the inside portion 212, extending vertically along the rear inner edge surface (inner edge surface) 52 of the windowpane 25, protruding from the rear inner edge surface 52. The rear slider 192 is retained along the rear inner edge surface 52 of the windowpane 25 with its rear extending portion 194 bonded to the rear inner edge surface 52 of the windowpane 25 with an adhesive 239. There is thus no need to mount the rear slider 192 to the windowpane 25 with a bolt. This can eliminate the exposure of a bolt head at the outer surface of the windowpane 25, avoiding the generation of hissing sounds due to a bolt head, and improving the appearance.

The concealing portion 238 is formed by applying, for example, black ceramic to the rear inner edge surface 52 of the windowpane 25. The concealing portion 238 conceals the rear extending portion 194 and the seal 225 from view from outside. The concealing portion 238 may alternatively be formed by a glass laminate including an opaque colored film or the like as a windowpane intermediate film, or may be formed by attaching a black film or the like to the windowpane surface by printing or the like.

A main or major part of the rear slider 192 is covered by the rear outer guide 187, that is, the front edge portion 185a of the rear garnish 185 so as to be concealed from view from outside. In this manner, the rear slider 192 is concealed from view from outside.

The seal 225 integrally formed at the front edge of the inner restriction rubber 202 includes a proximal portion 226 and a lip 227.

With the integral formation of the seal 225 with the inner restriction rubber 202, when mounting the inner restriction rubber 202 to the base 201 to form the rear inner guide 186, a fitting portion 226b formed at the proximal portion 226 of the seal 225 is fitted into a fitting depression 214a of the projecting portion 214.

As a result, the inner guide 186 can be integrated with the seal 225. When mounting the inner guide 186 to the rear sash portion 23, the seal 225 can be integrally mounted to the rear sash portion 23. Thus the seal 225 can be easily mounted to the rear sash portion 23 with little effort.

The proximal portion 226 is integrally formed with the inner restriction rubber 202 and is mounted to the projecting portion 214 projecting forward from the guide portion 213, with an edge portion 226a abutting on an edge portion 81a of the lining 81. A distal edge portion 228 of the lip 227 integrally formed with the proximal portion 226 abuts on the rear extending portion 194 on the windowpane 25.

Generally, in order to maintain the sealing of a passenger compartment 229, the seal 225 is provided at the inner guide 186 and is put against the rear inner edge surface 52 of the windowpane 25.

To put the seal 225 against the rear inner edge surface 52 of the windowpane 25, however, it is necessary to locate it toward the center of the windowpane 25, avoiding the rear extending portion 194. To conceal the seal 225, the concealing portion 238 provided on the rear inner edge surface 52 of the windowpane 25 is increased in width.

To avoid this, a surface 194a of the rear extending portion 194 bonded to the windowpane 25 is formed flat, and the seal 225 is put against the flat surface 194 so as to maintain the sealing of the passenger compartment 229. As a result, the seal 225 can be located closer to a rear edge 52a of the windowpane 25 to reduce the width W5 of the concealing portion 238 provided on the rear inner edge surface 52 of the windowpane 25 for concealing the seal 225 and the like, thereby to ensure good visibility.

Now, the process of assembling the automotive windowpane support structure 180 in the third embodiment will be described with reference to FIGS. 15A to 15F.

Figure 15A:
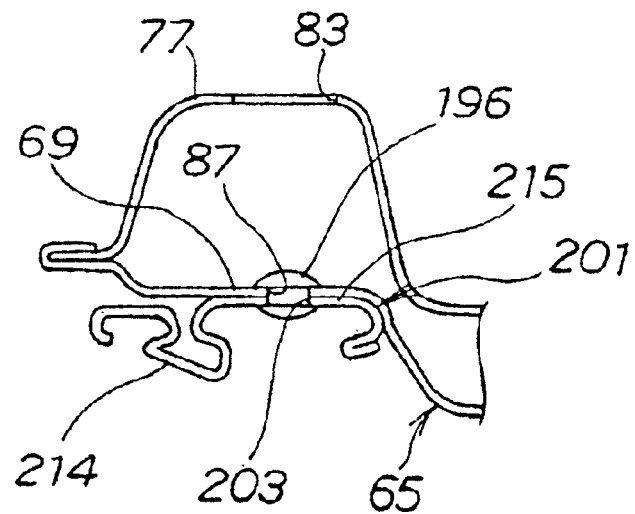
FIGS. 15A to 15F are diagrams illustrating the steps of assembling the automotive windowpane support structure in the third embodiment.

In FIG. 15A, the guide bottom 215 of the base 201 is put on the outer front flat portion 69 of the outer sash portion 65, and the rivet 196 is inserted through the through hole 87 of the outer front flat portion 69 and the through hole 203 of the guide bottom 215. The inserted rivet 196 is beaten down at its opposite ends to fix the base 201 to the outer sash portion 65.

Figure 15B:
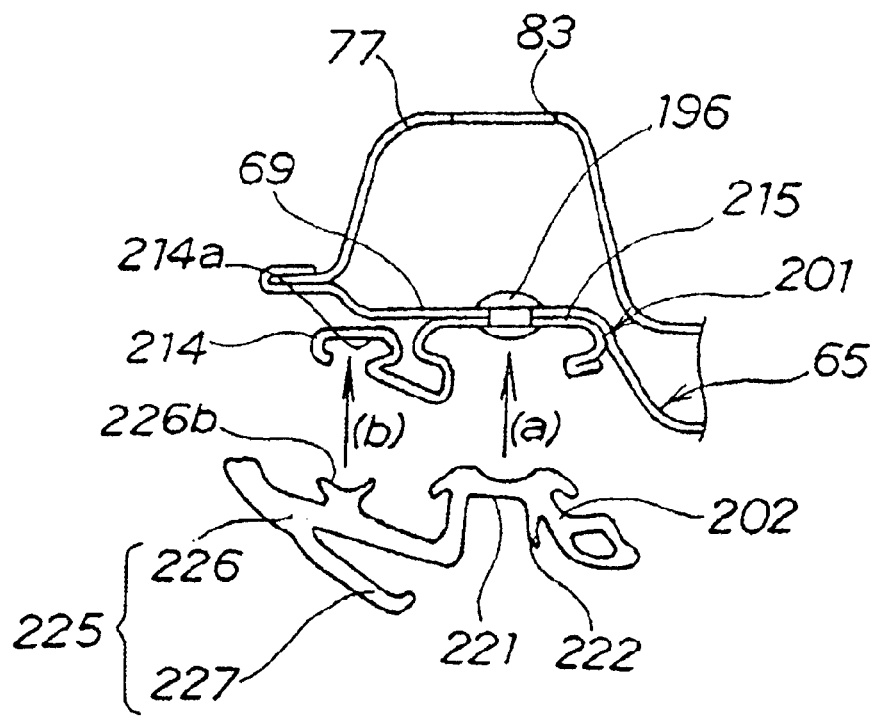

In FIG. 15B, the inner restriction rubber 202 is fitted to the base 201 as shown by arrow (a), and the fitting portion 226b formed at the proximal portion 226 of the seal 225 is fitted to the fitting depression 214a of the projecting portion 214 as shown by arrow (b).

Figure 15C:
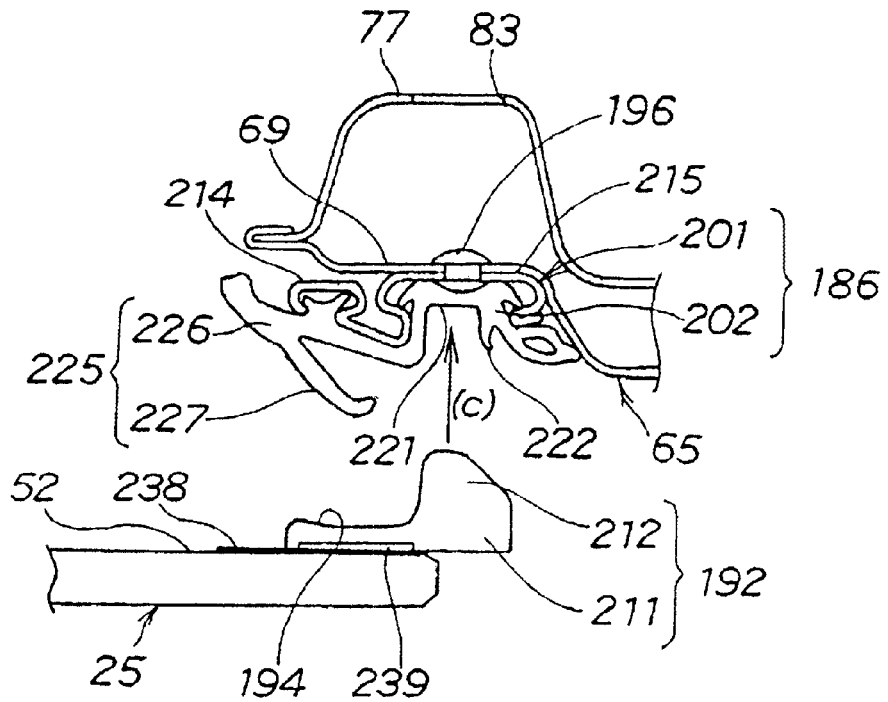

In FIG. 15C, the rear extending portion 194 is bonded to the rear inner edge surface 52 of the windowpane 25 with the adhesive 239, thereby to mount the rear slider 192 in such a manner as to be protruded from the rear inner edge surface (inner edge surface) 52 of the windowpane 25.

Then, the inside portion 212 of the rear slider 192 is inserted into the depressed inner periphery 221 of the inner restriction rubber 202 as shown by arrow (c).

Figure 15D:
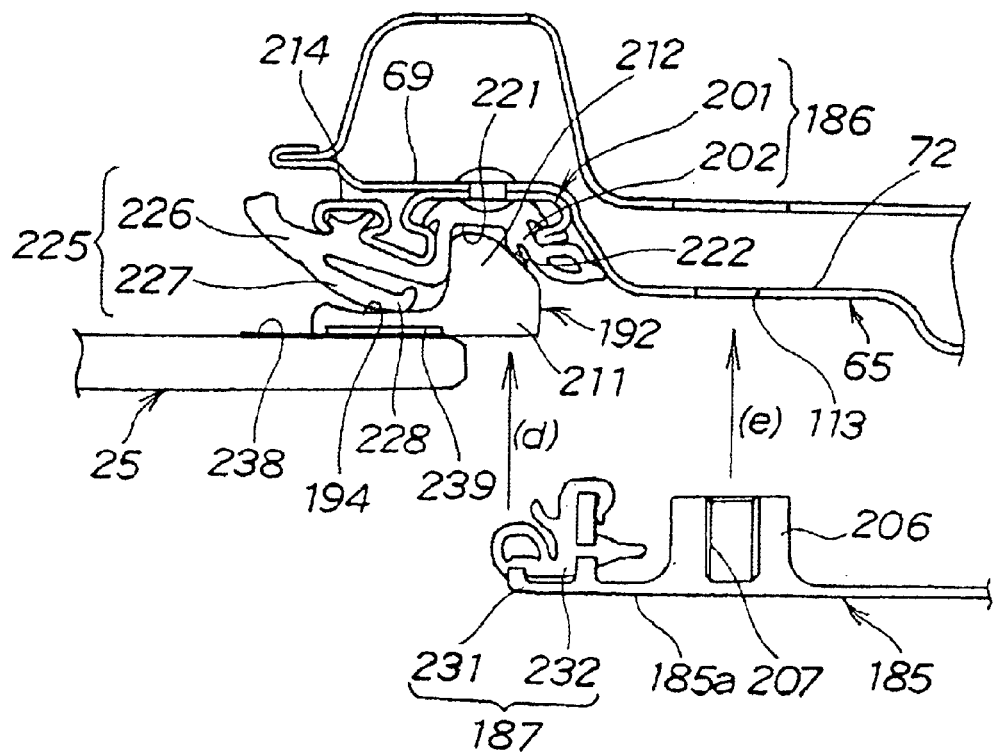

In FIG. 15D, the inside portion 212 of the rear slider 192 is put against a part of the depressed inner periphery 221 and the lip 222. At the same time, the distal edge portion 228 of the lip 227 of the seal 225 is put against the rear extending portion 194 located inside of the windowpane 25.

Then, the rear outer guide 187 provided at the front edge portion 185a of the rear garnish 185 is moved toward the rear slider side portion 211 of the rear slider 192 as shown by arrow (d), and the boss 206 of the rear garnish 185 is moved toward the through hole 113 of the outer sash portion 65 as shown by arrow (e).

Figure 15E:
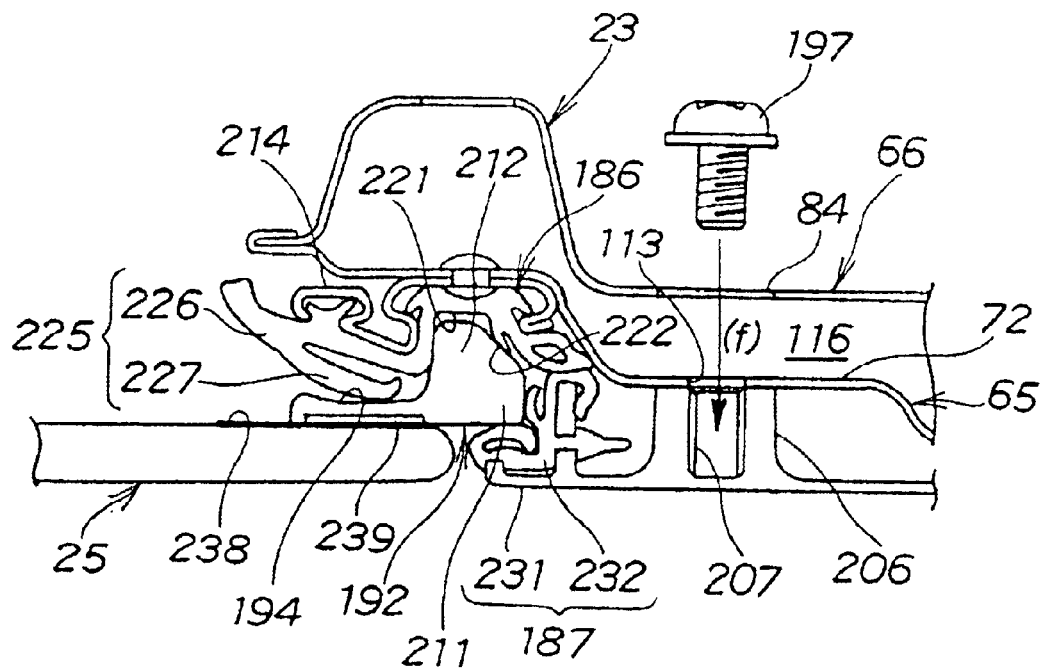

In FIG. 15E, with the threaded hole 207 of the boss 206 aligned with the through hole 113 of the outer middle flat portion 72, the bolt 197 is inserted through the second insertion hole 84 of the inner sash portion 66 into the second space 116 within the rear sash portion 23 as shown by arrow (f). The inserted bolt 197 is screwed into the threaded hole 207 through the through hole 113 of the outer sash portion 65.

Figure 15F:
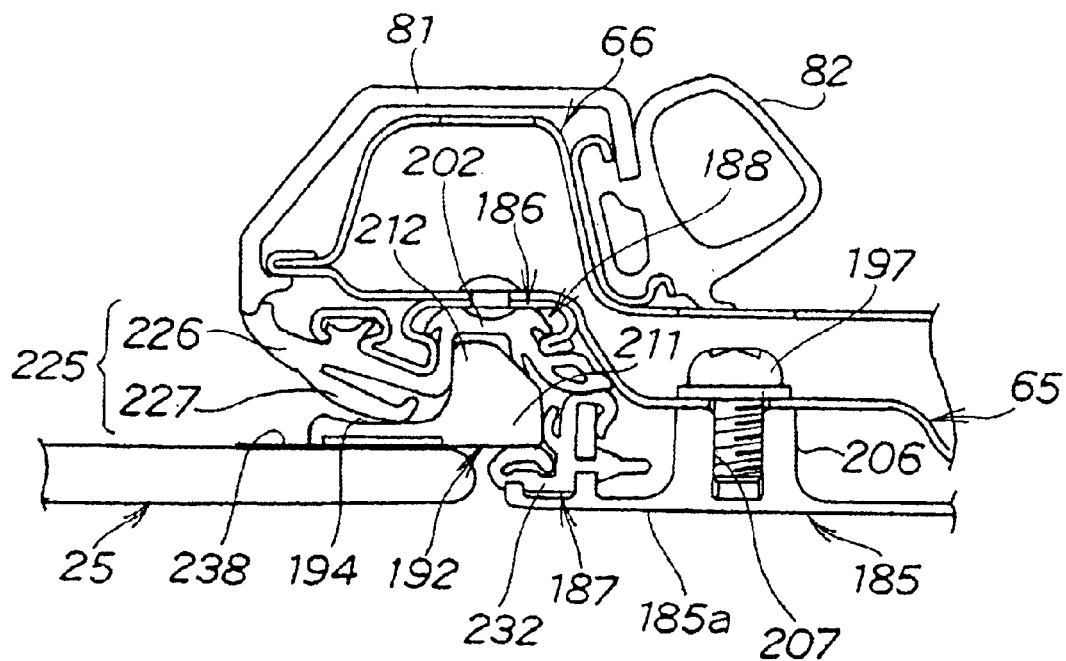

In FIG. 15F, the rear garnish 185 is mounted to the outer sash portion 65, and the rear slider 192 is slidably sandwiched between the rear inner guide 186 and the rear outer guide 187. Specifically, the inside portion 212 of the rear slider 192 is supported on the inner restriction rubber 202 of the rear inner guide 186, and the rear slider side portion 211 of the rear slider 192 is supported on the outer restriction rubber 232 of the rear outer guide 187.

As a result, the rear rail member 188 consisting of the rear inner guide 186 and the rear outer guide 187 restrict the movement of the rear slider 192 in automobile longitudinal and transverse (lateral) directions.

Then, the lining 81 and seal 82 are mounted to the inner sash portion 66.

As described above, the rear rail member 188 is comprised of the rear inner guide 186 and the rear outer guide 187. The rear inner guide 186 is provided at the rear sash portion 23, and the rear outer guide 187 is provided at the rear garnish 185. The rear garnish 185 is mounted whereby the rear inner guide 186 and the rear outer guide 187 support the rear slider 192 from inside and outside.

The rear rail member 188 is thus divided into two parts, the rear inner guide 186 and the rear outer guide 187, allowing the rear slider 192 to be easily fitted in the rear rail member 188, and facilitating the assembly operation.

Figure 16A:
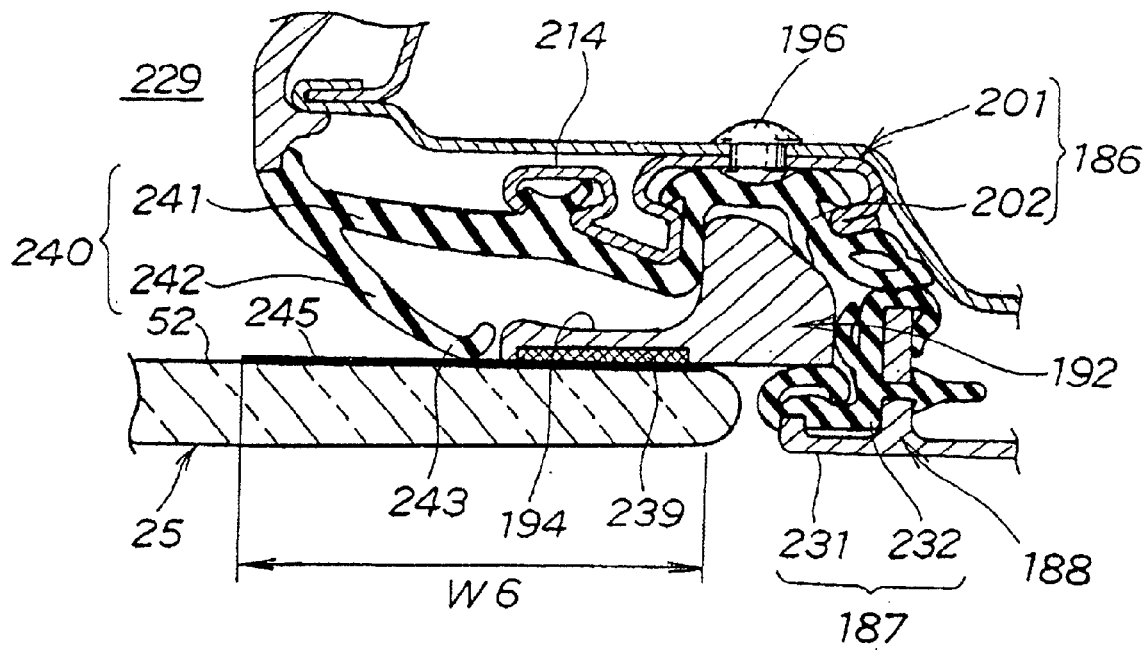
FIGS. 16A and 16B are cross-sectional views illustrating a comparative example with respect to the third embodiment and the support structure in the third embodiment, respectively.
Figure 16B:
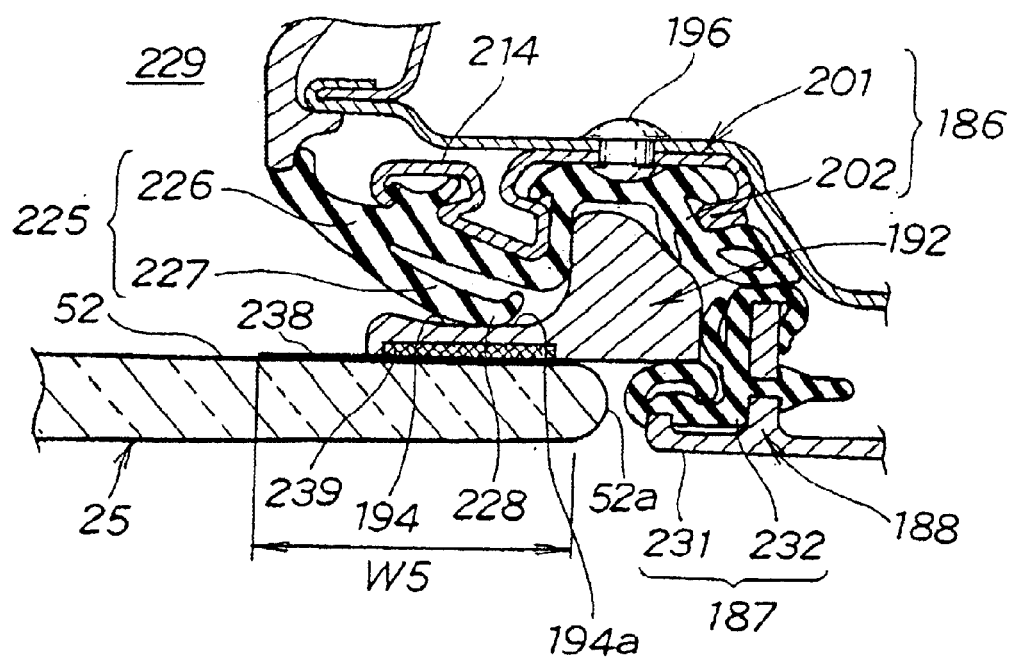
Figure 17:
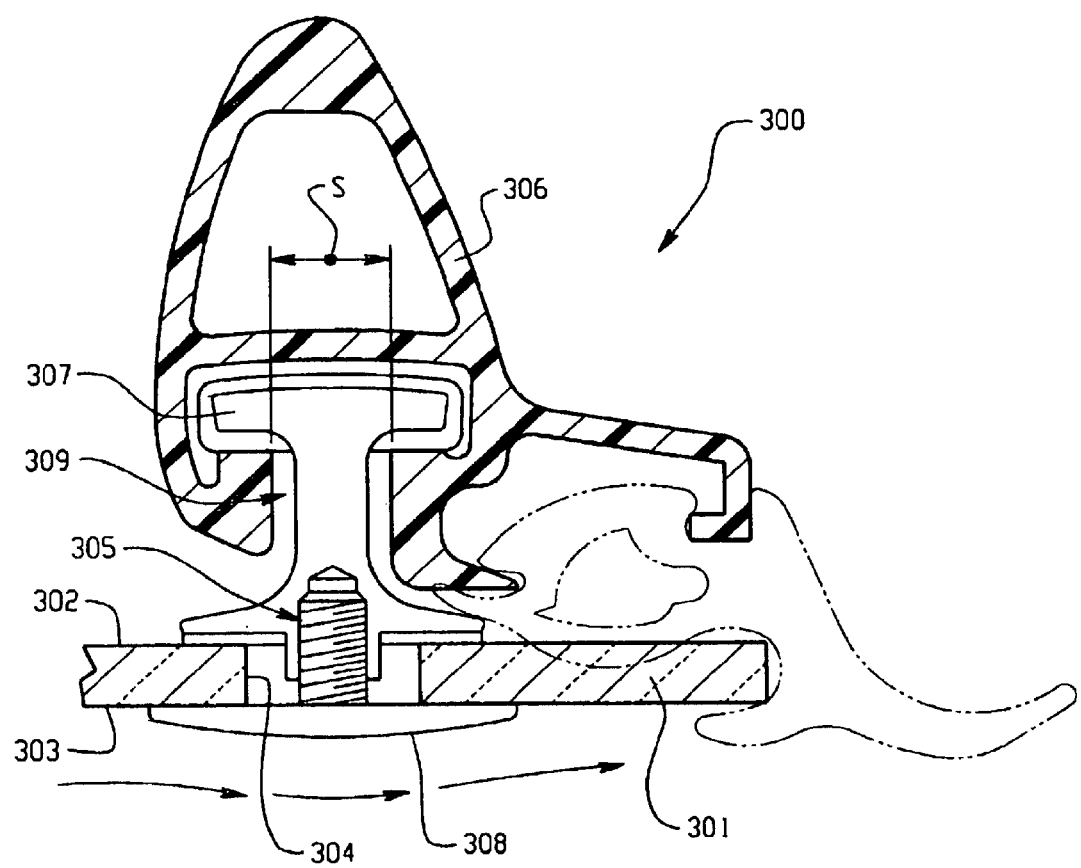
FIG. 17 is a cross-sectional view illustrating a conventional automotive windowpane support structure.

FIG. 16A illustrates a comparative example with respect to the windowpane support structure 180 according to the third embodiment, and FIG. 16B illustrates the support structure 180 according to the third embodiment.

As shown in FIG. 16A, generally, in order to maintain the sealing of a passenger compartment 229, a seal 240 is provided at a rear inner guide 186. That is, a projecting portion 214 is provided at the rear inner guide 186 and a proximal portion 241 of the seal 240 is fitted to the projecting portion 214 so that the seal 240 is provided at the rear inner guide 186.

The seal 240 largely projects toward the center of a windowpane 25 to keep a distal edge portion 243 of a lip 242 off from a rear extending portion 194 of a rear slider 192. Consequently, the distal edge portion 243 of the lip 242 is put against a rear inner edge surface 52 of the windowpane 25 to maintain the sealing of the passenger compartment 229.

However, since the seal 240 largely projects toward the center of the windowpane 25, a concealing portion 245 provided on the rear inner edge surface 52 of the windowpane 25 has a large width W6.

As shown in FIG. 16B, in the third embodiment of this invention, the surface 194a of the rear extending portion 194 contacting the windowpane 25 is formed flat, and the seal 225 is put against the flat surface 194 so as to maintain the sealing of the passenger compartment 229. The seal 225 can thus be located closer to the rear edge 52a of the windowpane 25 to reduce the width W5 of the concealing portion 238 provided on the rear inner edge surface 52 of the windowpane 25, and thereby to ensure good visibility.

The first embodiment has been described with the example of bonding the head 86a of the stud bolt 86 to the guide bottom 93 of the guide portion 91 with the adhesive, which is not limiting. Other means such as spot welding may alternatively be used for securement.

The third embodiment has been described with the example of mounting the rear inner guide 186 to the outer sash portion 65 of the rear sash portion 23 with the rivet 196, which is not limiting. Alternatively, a stud bolt may be used for mounting as in the first embodiment.

The first to third embodiments have been described on the automotive windowpane support structures 20, 20, 180, 180 provided at the left and right front side doors 11, 11 as automotive doors, and no description has been made on the automotive windowpane support structures provided at the left and right rear side doors 12, 12. The automotive windowpane support structures at the rear side doors 12, 12 can be configured the same as the automotive windowpane support structures 20, 180.

The first to third embodiments have been described with the decorative rear garnishes 27, 185 as typical examples of body exterior parts. Alternatively, the outer rear flat portion 74 of the outer sash portion 65 may be formed as a body exterior part to provide the rear outer guide 46 at the outer rear flat portion 74.

In FIGS. 2 and 11, a door mirror part (that is, the decorative front garnish 26, 181) may be formed as a front body exterior part so as to provide the front outer guide 42 at the door mirror part.

The above embodiments have been described with the example of providing the decorative front garnish 26 on the outer surface of the front sash portion 21, providing the decorative rear garnish 27 on the outer surface of the rear sash portion 23, and mounting the front and rear garnishes 26, 27 flush with the windowpane 25, which is not limiting. It is also possible to provide a decorative garnish on the outer surface of at least one of the front and rear sash portions 21, 23 and to mount the garnish flush with a windowpane.

Obviously, various minor changes and modifications of the present invention are possible in the light of the above teaching. It is therefore to be understood that within the scope of the appended claims the invention may be practiced otherwise than as specifically described.

What is claimed is:

1. An automotive windowpane support structure comprising:
    a windowpane mounted vertically movably along at least one of front and rear sash portions of an automotive door;
    a body exterior part mounted to the at least one sash portion in opposed relation to an outer surface of the at least one sash portion and being flush with the windowpane;
    separate inner and outer guides;
    wherein the inner guide is mounted to the at least one sash portion in opposed relation to the body exterior part;
    the outer guide is formed in an inside surface of the body exterior part and facing the inner guide such that at least a portion of the inner guide is disposed between said at least one sash portion and said outer guide in a direction generally perpendicular to a major face of said windowpane;
    a vertically extending slider movable along and guided by said inner and outer guides, the slider being bonded to an inner edge surface of the windowpane with an adhesive such that a side portion of said slider protrudes from the windowpane; and
    the outer guide receives and guides the protruding side portion of the slider, and the inner guide receives and guides portions of said slider other than the protruding side portion of the slider so that the slider is restricted in movement in automobile longitudinal and transversal directions.

2. The support structure as set forth in claim 1, wherein the vertically extending slider is a bar member extending vertically along an inner edge surface of the windowpane.

3. The support structure as set forth in claim 1, wherein the inner guide has a guide bottom superimposed on the at least one sash portion, and the superimposed guide bottom is fixed to said at least one sash portion.

4. The support structure as set forth in claim 1, wherein said portions of said slider other than the protruding side portion of the slider include an extending portion extending along and being bonded to an inner edge surface of the windowpane.

5. The support structure as set forth in claim 4, wherein the inner guide has a seal, the seal being placed against the extending portion.

6. The support structure as set forth in claim 5, wherein the seal is integrally formed with the inner guide.

* * * * *